US010237157B1

(12) United States Patent
Sears et al.

(10) Patent No.: US 10,237,157 B1
(45) Date of Patent: Mar. 19, 2019

(54) MANAGING HOST FAILURES IN A TRAFFIC FORWARDING SYSTEM

(71) Applicant: Amazon Technologies, Inc., Seattle, WA (US)

(72) Inventors: Richard Michael Sears, Seattle, WA (US); Andrew Gary Hourselt, Seattle, WA (US); Douglas Stewart Laurence, Mercer Island, WA (US); Neha Shetty, Seattle, WA (US); James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 581 days.

(21) Appl. No.: 14/736,161

(22) Filed: Jun. 10, 2015

(51) Int. Cl.
*H04L 12/26* (2006.01)
*H04L 29/12* (2006.01)
*H04L 12/707* (2013.01)

(52) U.S. Cl.
CPC .............. *H04L 43/10* (2013.01); *H04L 45/24* (2013.01); *H04L 61/251* (2013.01)

(58) Field of Classification Search
CPC .. H04L 43/10; H04L 47/125; H04L 29/06068
See application file for complete search history.

(56) References Cited

U.S. PATENT DOCUMENTS

| 7,042,837 B1 | 5/2006 | Cassiday et al. |
| 8,208,370 B1 | 6/2012 | Mitchell, Jr. et al. |
| 8,243,589 B1 * | 8/2012 | Trost ................... H04L 67/1034 370/220 |
| 8,434,139 B1 | 4/2013 | Ortiz, Jr. |
| 8,886,831 B2 | 11/2014 | Tirumalai et al. |
| 8,918,670 B2 | 12/2014 | Wakelin |
| 8,934,487 B2 | 1/2015 | Vogt et al. |
| 9,367,379 B1 * | 6/2016 | Burke ..................... G06F 9/546 |
| 9,432,245 B1 | 8/2016 | Sorenson, III et al. |

(Continued)

OTHER PUBLICATIONS

K.G. Anagnostakis, "Tao: Protecting against Hitlist Worms using Transparent Address Obfuscation", Proceedings of the 10th IFIP Open Conference on Communications and Multimedia Security, 2006, pp. 1-11.

(Continued)

*Primary Examiner* — Rhonda L Murphy
(74) *Attorney, Agent, or Firm* — Robert C. Kowert; Meyertons, Hood, Kivlin, Kowert & Goetzel, P.C.

(57) ABSTRACT

Methods and apparatus for handling failure of servers in traffic forwarding (TF) systems between networks. A TF system may include units each including multiple servers. Outbound and inbound traffic for a local network may be distributed among the units according to a routing technique, with each unit responsible for an allocated portion of the traffic. Servers in a unit may participate in a health check protocol to detect servers that are not healthy. If the healthy servers in a unit drops below a threshold at which the unit cannot reliably handle its allocated portion of the traffic, the servers may automatically take the unit out of service, for example by stopping advertisement of routes, and the traffic may be reallocated across the remaining units. This may help prevent congestion-related delays, high latency, packet losses, and other problems on connections through the unhealthy unit.

23 Claims, 22 Drawing Sheets

(56) References Cited

U.S. PATENT DOCUMENTS

| | | | |
|---|---|---|---|
| 2002/0078232 A1 | | 6/2002 | Simpson et al. |
| 2006/0092950 A1* | | 5/2006 | Arregoces ............... H04L 45/24 |
| | | | 370/396 |
| 2009/0249115 A1 | | 10/2009 | Bycroft et al. |
| 2012/0297237 A1* | | 11/2012 | Chatterjee ........... G06F 17/3056 |
| | | | 714/4.1 |
| 2014/0013324 A1 | | 1/2014 | Zhang et al. |
| 2014/0258496 A1* | | 9/2014 | Wu ..................... H04L 67/1002 |
| | | | 709/223 |
| 2014/0351447 A1* | | 11/2014 | Annamalaisami ........................... |
| | | | H04L 65/1069 |
| | | | 709/227 |

OTHER PUBLICATIONS

Florent Fourcot, et al., "IPv6 address obfuscation by intermediate middlebox in coordination with connected devices", Advances in Communication Networking, Springer Berlin Heidelberg, 2013. 148-160.

D. Thaler, et al., "IAB Thoughts on IPv6 Network Address Translation", Internet Architecture Board Request for Comments 5902, Jul. 2010, pp. 1-15.

Tim Rooney, "IPv4-to-IPv6 Transition Strategies", International Network Services (INS) Whitepaper, Feb. 2007, pp. 1-32.

U.S. Appl. No. 14/573,636, filed Dec. 17, 2014, Douglas Laurence, et al.

U.S. Appl. No. 14/736,157, filed Jun. 10, 2015, Richard Sears, et al.

* cited by examiner

MANAGING HOST FAILURES IN A TRAFFIC FORWARDING SYSTEM

BACKGROUND

A network may include two or more data centers, each data center may house hundreds or thousands of host devices (e.g., web servers, application servers, data servers, etc.) on a local network. Each data center network may include various network equipment (e.g., servers, switches, routers, load balancers, gateways, etc.) configured to send outgoing data from the host devices onto external networks to be routed to various destinations, and to receive incoming data from sources and route the data to various destination host devices on the data center network. Each data center network may implement a private address space according to a network protocol for routing data to endpoints on the local network. Border devices of a data center network may translate outgoing data packets from the private address space of the data center network to a network protocol used for routing packets on the external network, and translate incoming data packets from the external network communications protocol to the private address space of the data center network. The data center networks may also intercommunicate via one or more communications channels, paths, or pipes.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for traffic forwarding in networks are described. Embodiments of the methods and apparatus for traffic forwarding in networks as described herein may, for example, be implemented in the context of a service provider that provides to clients, via an intermediate network such as the Internet, virtualized resources (e.g., virtualized computing and storage resources) implemented on a provider network of the service provider, and that may provide virtualized private networks on the provider network in which clients may provision their virtualized resources. FIGS. 8 through 11 and the section titled Example provider network environments illustrate and describe example service provider network environments in which embodiments of the methods and apparatus as described herein may be implemented.

A network such as a provider network may include a production network and a border network. The production network may implement private Internet Protocol (IP) address spaces, for example 32-bit IP addresses within Internet Protocol version 4 (IPv4) address ranges or subnets. Sources (e.g., endpoints such as computation resources, servers, host systems, etc.) on the production network may be assigned IP addresses (e.g., 32-bit IPv4 addresses) within the production network address spaces. The border network is between the production network and an external network (e.g., the Internet); the border network and external network may support a larger public IP address space, for example 128-bit Internet Protocol version 6 (IPv6) addresses. In some embodiments, border devices of the production network may advertise or publish IPv6 subnet address spaces on the border network, and may map the IPv4 address space of the production network to the published IPv6 address space.

Figure 2A:
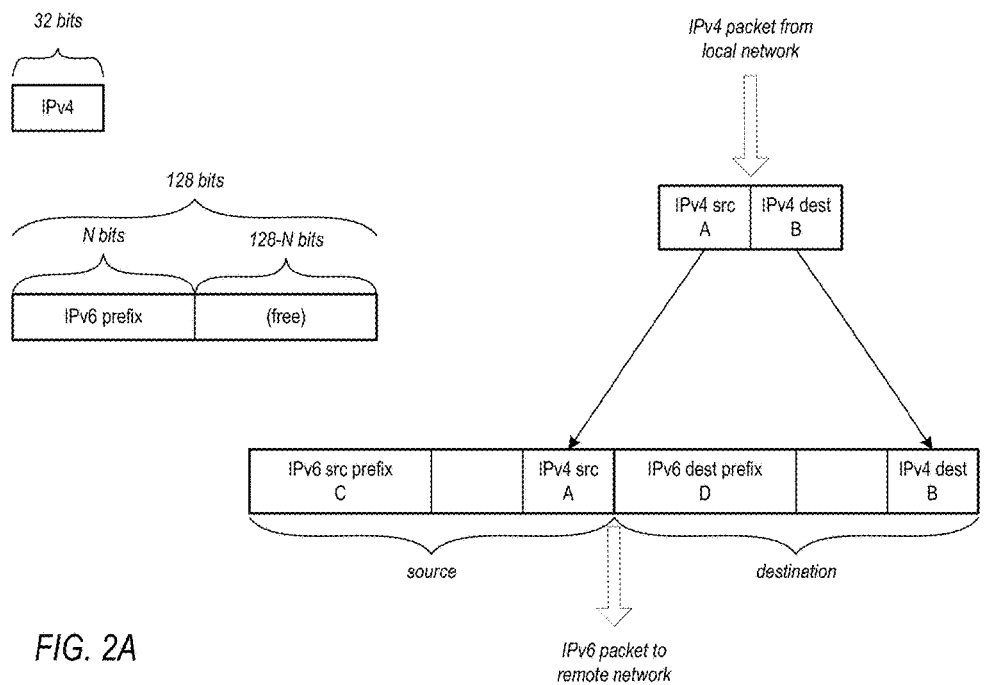
FIG. 2A graphically illustrates converting IPv4 addresses to IPv6 addresses in outgoing packets, according to at least some embodiments.
Figure 2B:
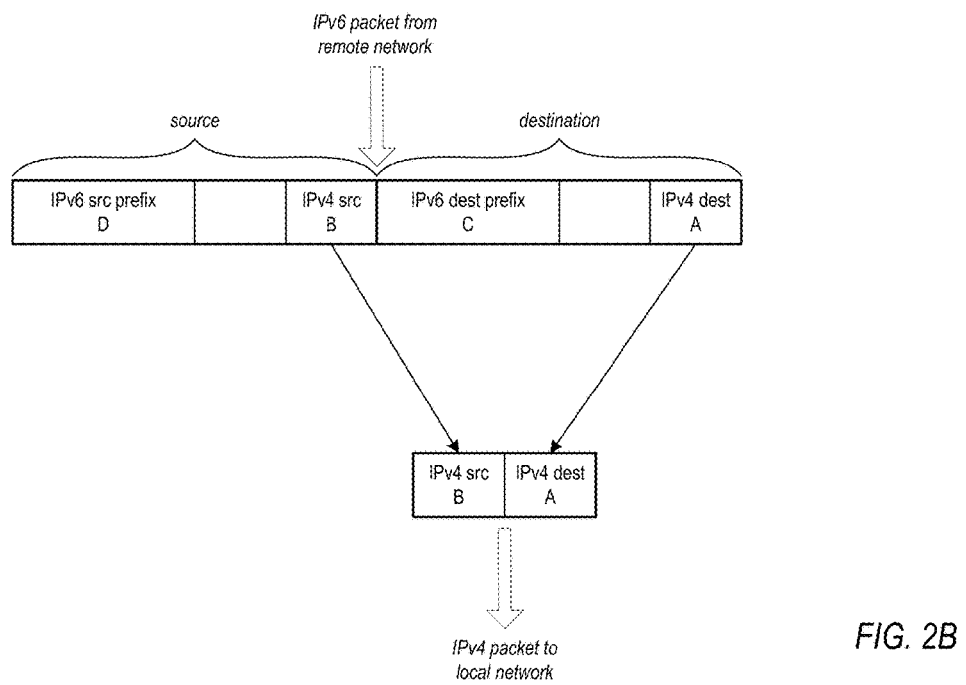
FIG. 2B graphically illustrates converting IPv6 addresses to IPv4 addresses in incoming packets, according to at least some embodiments.

A traffic forwarding (TF) system is described that handles egress of packets from a production network using a first protocol (e.g., IPv4) onto a border network using a second protocol (e.g., IPv6). The TF system translates the production network packet addresses from private address spaces (e.g., private networks or subnets) of the production network (e.g., IPv4 subnets) to address spaces of the border network (e.g., IPv6 subnets). FIG. 2A graphically illustrates a method for converting IPv4 addresses to IPv6 addresses in outgoing packets, according to some embodiments. In some embodiments, the TF system is stateless; that is, the TF system translates and forwards packets onto the border network, but does not maintain or track active network connections over the border network. In some embodiments, the TF system may also handle ingress of packets from the border network onto the production network. The TF system translates the border network packet addresses from the address spaces of the border network (e.g., IPv6 address spaces) to the address spaces of the production network (e.g., IPv4 address spaces). FIG. 2B graphically illustrates a method for converting IPv6 addresses to IPv4 addresses in incoming packets, according to at least some embodiments.

A network, for example a provider network, is described that may include multiple zones, with each zone including a TF system between a local production network and a local border network of the network. Embodiments of methods and apparatus for handling failure of TF systems in networks are described in which connection requests from local sources in a zone to local destinations in the zone are gracefully and quickly responded to by TF systems in other zones of the network if the local TF system has failed, rather than making the sources wait for the connection requests to the local TF system to timeout while "black holing" outgoing packets. The failure handling methods may also prevent packets sent from a local source in a zone to a local destination in the zone from transiting TF systems in other zones and traversing relatively thin, capacity-constrained communications channels, paths, or pipes between the local border networks in the zones when the TF system in the source's zone fails. The failure handling methods may also prevent packets sent from local sources in a zone to local destinations in the zone from overwhelming capacity-constrained firewalls or other network devices in the zone when the TF system in the zone fails.

In some embodiments, a TF system in a zone may include two or more TF units, with each TF unit including multiple TF hosts or servers. Outbound traffic from the local production network may be distributed among the TF units, for example according to an ECMP (equal-cost multi-path) routing technique that spreads total outgoing bandwidth across the TF units, with each TF unit responsible for an allocated portion of the bandwidth. Embodiments of methods and apparatus for handling failure of TF servers in TF units are described in which the health of TF servers in a TF unit is monitored, for example according to a health check protocol implemented by the TF servers, to detect TF servers in the TF unit that are not healthy or not online. If the health of the TF servers in a TF unit is detected to have dropped below a threshold at which the TF unit cannot reliably handle its allocated portion of the total outgoing bandwidth, then the TF servers in the TF unit may automatically stop advertising routes or otherwise take the TF unit out of service in the TF system. The total outgoing bandwidth may then be re-allocated across the remaining TF units in the TF system, for example according to the ECMP routing technique. In at least some embodiments, the remaining TF units may include healthy units with enough spare capacity to handle the additional traffic. Having the TF servers in a TF unit take the unhealthy TF unit out of service rather than allowing the TF unit to continue attempting to process and forward its allocated portion of the outgoing traffic may help prevent congestion-related delays, high latency, packet losses, and other problems on connections through the unhealthy TF unit.

Figure 1A:
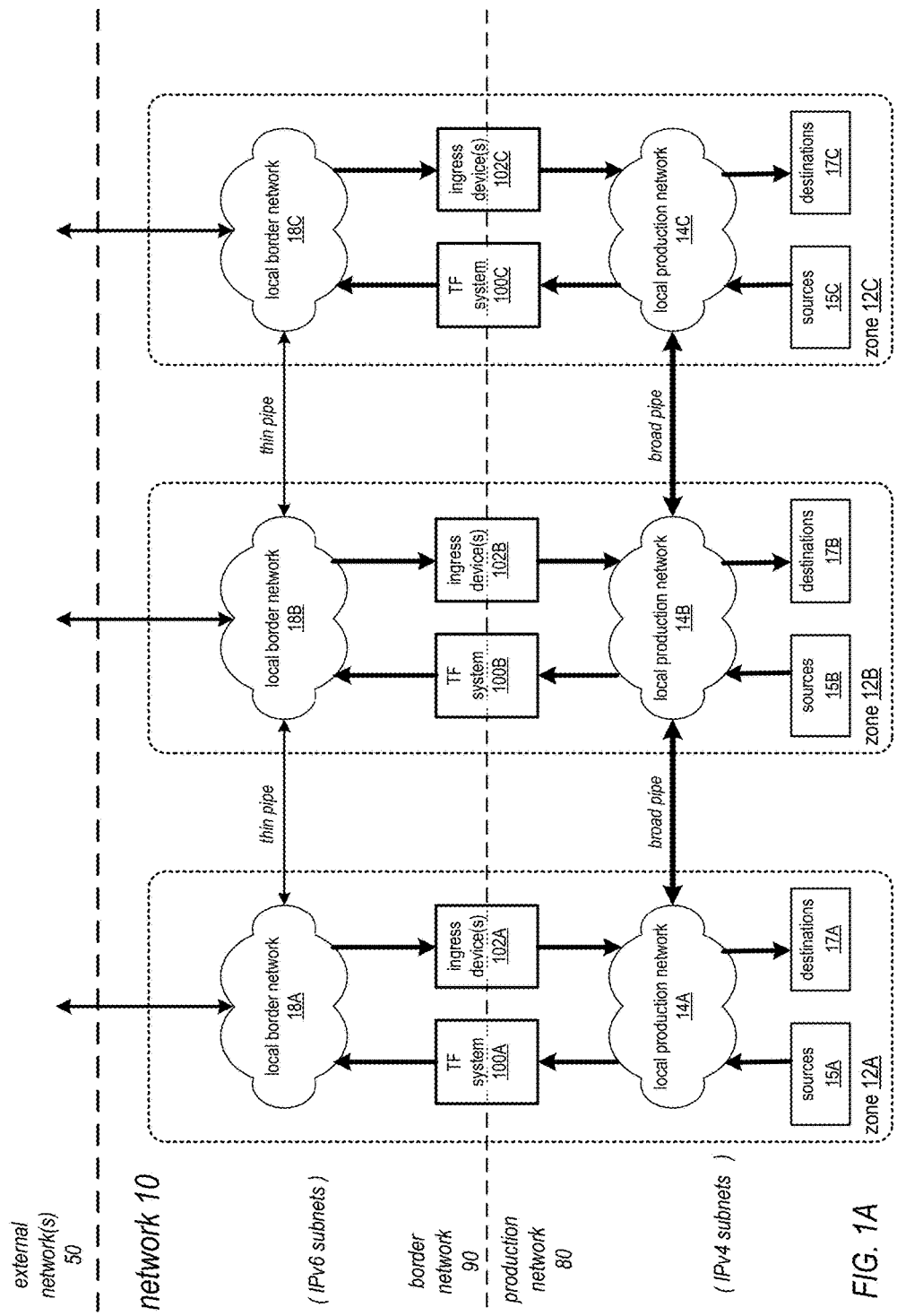
FIG. 1A graphically illustrates an example network in which embodiments of a traffic forwarding (TF) system as described herein may be implemented.

FIG. 1A graphically illustrates an example network 10 (e.g., a provider network) in which embodiments of a TF system as described herein may be implemented. A network 10 may include a production network 80 on which various clients and/or servers may be implemented, and a border network 90 that connects the production network 80 to external network(s) 50 such as the Internet. The network 10 may include two or more zones 12, each zone 12 containing a local production network 14 portion and a local border network 18 portion. In some embodiments, the network 10 may be implemented across two or more data centers with each zone 12 implemented in, and thus corresponding to, a data center. However, in some embodiments, a data center may include two or more zones 12. While not shown, in some embodiments, the network 10 may include two or more regions, each region including one or more of the zones 12.

The local production network 14 of each zone 12 may implement one or more private address spaces (e.g., private networks or subnets) according to a network protocol, for example IPv4, for routing data to endpoints (sources and/or destinations) on the local production network 14. The local border network 18 of each zone 12 may implement address spaces or subnets according to a network protocol used for routing packets on the border network 90, for example IPv6.

The local production network 14 of each zone 12 may implement one or more private or local Internet Protocol (IP) address spaces according to a network protocol, for example 32-bit IP addresses within IPv4 address ranges. Sources 15 and destinations 17 (e.g., endpoints such as computation resources, storage resources, servers, host systems, etc.) on the local production network 14 of a zone 12 may be assigned IP addresses (e.g., 32-bit IPv4 addresses) within the local production network 14's address spaces. The local border network 18 of each zone 12 may support a larger public IP address space according to a different network protocol (e.g., a 128-bit IPv6 address space).

As shown in FIG. 1A, in some embodiments of a network 10, the local production networks 14 in the zones 12 may be interconnected via relatively broad (i.e., high bandwidth) data communications channels or pipes, for example dedicated physical cable interconnects between the respective zones 12 or data centers. The local border networks 18 may also be interconnected, but typically with relatively thin pipes (limited bandwidth, and thus capacity-constrained, communications channels) when compared to the pipes connecting the local production networks 14. In addition to being potentially thin, capacity-constrained pipes, the communications channels between local border networks 18 may traverse external networks such as the Internet, may be more expensive to use, may be less secure, or may be otherwise less desirable to use for traffic between sources 15 and destinations 17 on the production network 80.

Each zone 12 may include one or more devices or systems that serve as border devices between the local production network 14 and local border network 18. A border device may be any device, system, or node that is located on a border between networks and that is configured to control data flow between the networks. For example, a border device may be, but is not limited to, a firewall, a router, or a load balancer or load balancer node. In some embodiments, border devices may be stateful devices that track active network connections, or stateless devices that do not track active network connections. A border device may be an egress device (e.g., a TF system 100) that translates outgoing packets from sources 15 in the private address space(s) of the local production network 14 (e.g., IPv4 address space(s)) to the network protocol used for routing packets on the border network 90 (e.g., IPv6), an ingress device 102 that translates incoming packets targeted at destinations 17 from the network protocol used for routing packets on the border network 90 to the private address space(s) of the local production network 14, or a device that performs as both an ingress and egress device for the local production network 14.

As shown in FIG. 1A, each zone 12 in the network 10 includes a traffic forwarding (TF) system 100 that serves as an egress border device for sources 15 on the respective local production network 14. In at least some embodiments, the TF system 100 in a zone 12 may advertise or publish an IPv6 subnet address space for the local production network 14 to the local border network 18 of the respective zone 12. In some embodiments, the TF system 100 in a zone 12 may also advertise routes for IPv4 subnets located in the same zone 12 and/or in other zones 12 or regions of the network 10 to the local production network 14. In addition, a TF system 100 may advertise routes to destinations in its respective zone 12 on the production networks 14 of other zones 12. In at least some embodiments, a TF system 100 in a zone 12 may be configured to receive outgoing packets (e.g., IPv4 packets) from sources 15 (e.g., computation resources, servers, host systems, etc.) on the local production network 14, convert the packets to an IP address space used on the border network 90 (e.g., an IPv6 address space), and send the IPv6 packets onto the local border network 18 for delivery to respective destinations (e.g., endpoints such as storage resources, servers, host systems, etc.). FIG. 2A graphically illustrates a method for translating IPv4 addresses to IPv6 addresses in outgoing packets, according to at least some embodiments.

In some embodiments, a TF system 100 may also handle ingress of packets from the border network 90 onto the production network 80, for example response traffic from destinations 17 sent to the sources 15 that initiated the outbound connections on routes advertised in a local production network 14. The TF system 100 translates the border network packet addresses from the address spaces of the border network 90 (e.g., IPv6 address spaces) to the address spaces of the local production network 14 (e.g., IPv4 address spaces). FIG. 2B graphically illustrates a method for converting IPv6 addresses to IPv4 addresses in incoming packets, according to at least some embodiments.

In at least some embodiments, a TF system 100 is a stateless border device; that is, the TF system 100 translates and forwards packets from sources on the production network 80 onto the border network 90 for delivery to destinations, but does not maintain or track active network connections from the sources on the production network 80 to the destinations over the border network 90.

In at least some embodiments, a TF system 100 in a zone 12 may be a distributed system that may include one or more units or clusters, with each unit or cluster including two or more TF devices or servers. Each TF server includes two or more network interface controllers (NICs) and implements TF logic that provides some amount of bandwidth for forwarding traffic (e.g., 10 gigabits per second (Gbps) per NIC). Each TF unit includes routers that distribute traffic among the TF servers in the respective unit, for example according to an ECMP (equal-cost multi-path) routing technique. In addition, routing technology distributes traffic among the TF units in a zone 12, for example according to an ECMP routing technique. FIGS. 5A through 5D illustrate components of an example TF system 100, according to some embodiments.

In some embodiments of a network 10, at least some traffic from sources 15 in subnets of the production network 80 for destinations 17 in subnets of the production network 80 is forwarded from the production network 80 onto the border network 90 via respective TF systems 100, and then routed to the destinations 17 from the border network 90 onto the production network 80 via respective ingress devices 102. The destinations of the outgoing packets may include destinations 17 in the same zone 12 as the sources 15, or destinations 17 in other zones 12 or regions of the network 10. A destination 17 in the same zone 12 of a source 15 may be in a different subnet of the local production network 14.

While FIG. 1A shows each zone 12 including a local production network 14 and a local border network 18 with a TF system 100 that handles traffic forwarding from the local production network 14 onto the local border network 18, in some embodiments of a network 10, a zone 12 may include two or more local production networks 14 that share a common local border network 18 and TF system 100. For example, a zone 12 may include two data centers (DCs) that each implement a separate local production network 14, with a common TF system 100 and border network 18 infrastructure shared by the two DCs/production networks 14 in the zone 12. In this implementation, since the two local production networks 14 share a common TF system 100 and border network 18 address space, the local production networks 14 would implement non-overlapping subnet address spaces so that traffic can be correctly routed from and to endpoints on the local production networks 14 by the TF system 100.

Figure 1B:
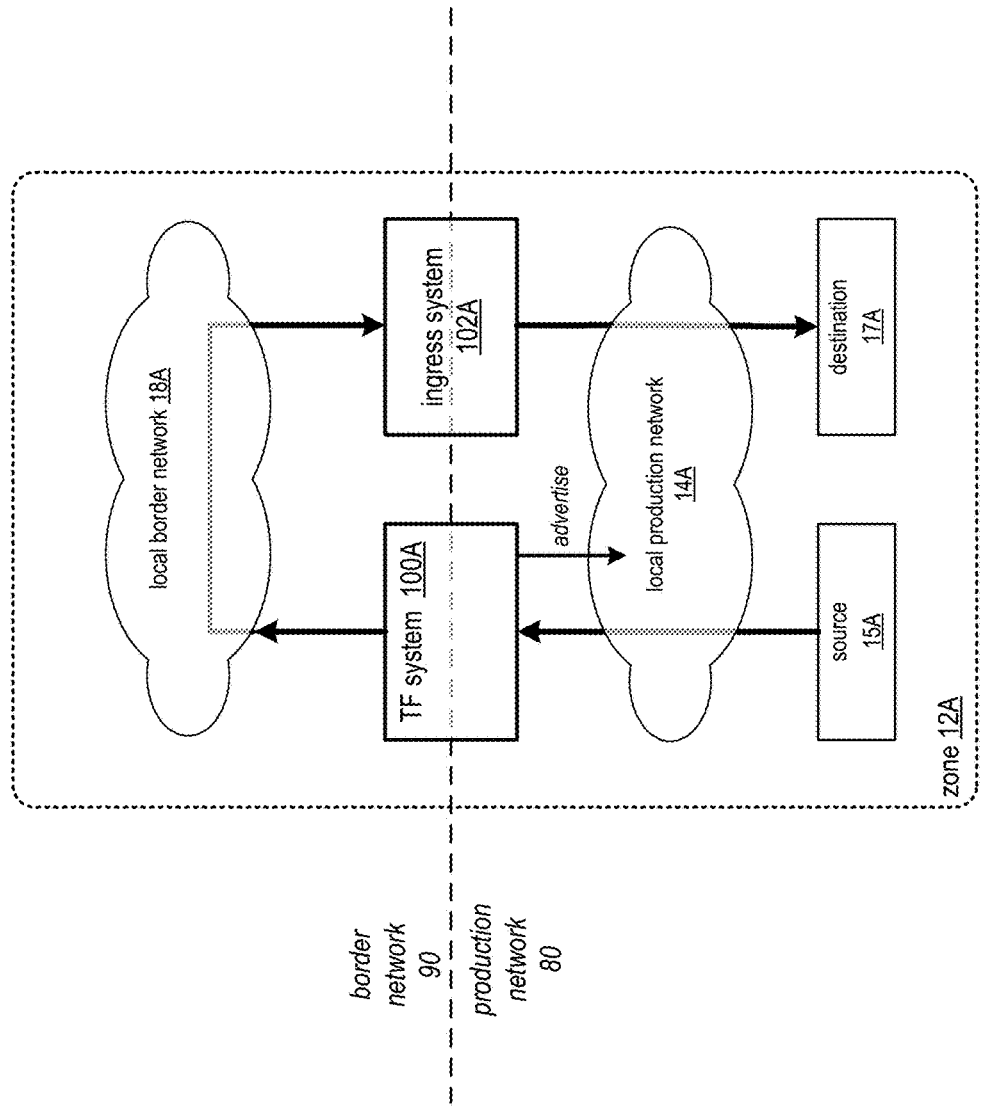
FIG. 1B graphically illustrates forwarding of local traffic from a source in a zone to a destination in the same zone, according to some embodiments.
Figure 1C:
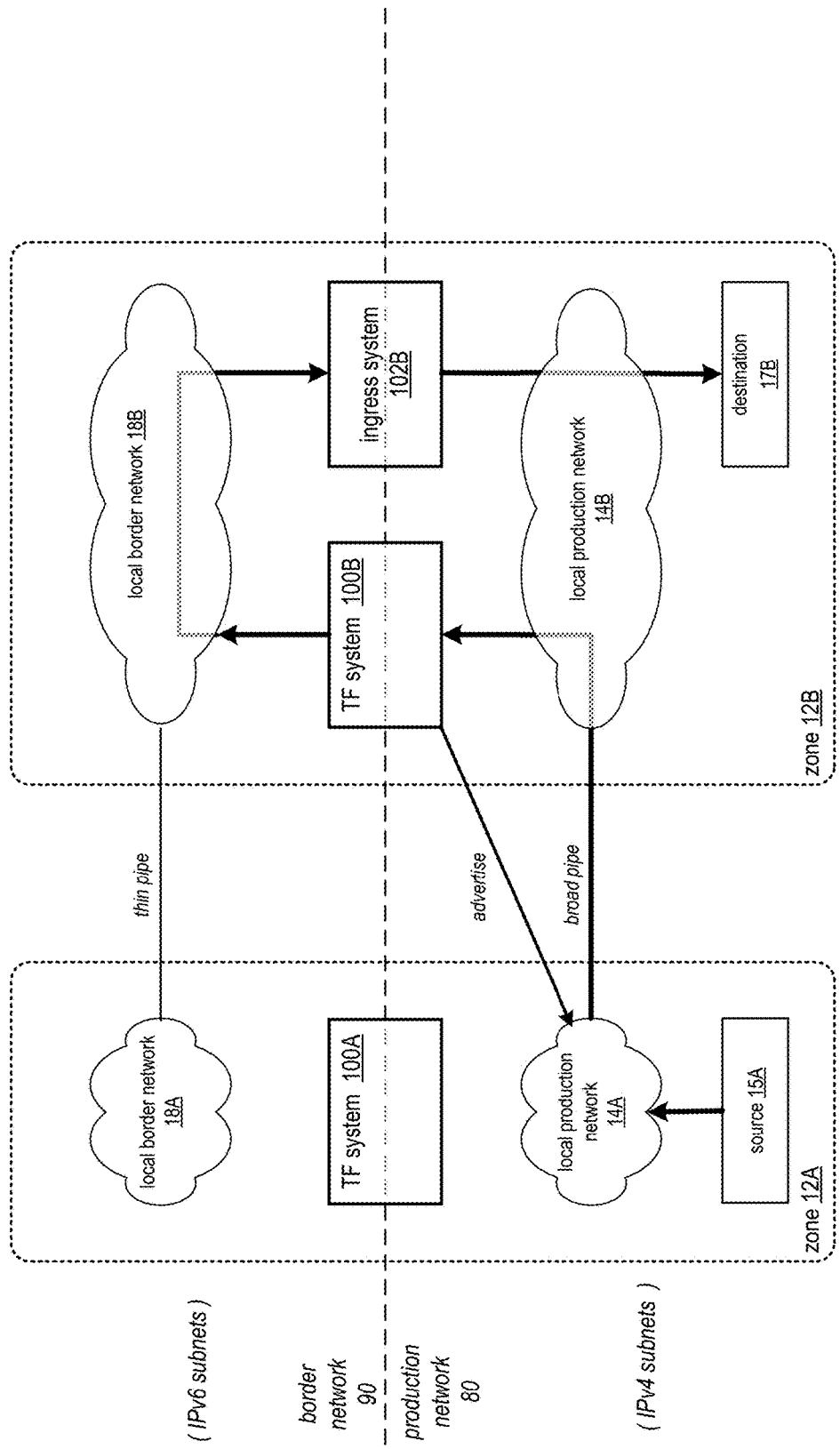
FIG. 1C graphically illustrates forwarding of traffic from a source in a zone to a destination in a different zone, according to some embodiments.

FIGS. 1B and 1C illustrate forwarding of traffic from sources 15 to destinations 17 through the border network, according to some embodiments. As previously noted, the TF system 100 in a zone 12 may advertise or publish an IPv6 subnet address space for the local production network 14 to the local border network 18 of the respective zone 12. In addition, the TF system 100 in a zone 12 may advertise routes for IPv4 subnets located in the same zone 12 and/or in other zones 12 or regions of the network 10 to the local production network 14. In addition, a TF system 100 may advertise routes to destinations in its respective zone 12 on the production networks 14 of other zones 12. Sources 15 in zones 12 may discover the advertised routes for destinations 17 in the same zone 12 or for destinations 17 in different zones 12, and may send traffic to respective destinations 17 via the respective TF systems 100 that advertise the routes.

FIG. 1B graphically illustrates forwarding of local traffic from a source 15A in a zone 12A to a destination 17A in the same zone 12A, according to some embodiments. As shown in FIG. 1B, traffic from a source 15A in a zone 12A that is targeted at a destination 17A in the same zone 17A egresses the local production network 14A through the TF system 100A in zone 12A, transits the local border network 18A of zone 12A to an ingress device 102A of zone 12A, enters the local production network 14A through the ingress device 102A, and is delivered to the target destination 17A via the local production network 14A.

FIG. 1C graphically illustrates forwarding of traffic from a source 15A in a zone 12A to a destination 17B in a different zone 12B, according to some embodiments. As shown in FIG. 1A, in some embodiments of a network 10, the local production networks 14 in the zones 12 may be interconnected via relatively broad (i.e., high bandwidth) data communications channels or pipes, for example dedicated physical cable interconnects between the respective zones 12 or data centers. The local border networks 18 may also be interconnected, but typically with relatively thin pipes when compared to the pipes connecting the local production networks 14. In addition to being thin pipes, the communications channels between local border networks 18 may traverse external networks such as the Internet, may be more expensive to use, less secure, or may be otherwise less desirable to use for traffic between sources 15 and destinations 17 on the production network 80. In some embodiments, as shown in FIG. 1C, to avoid overloading the thin pipes between the local border networks 18 of the zones, and/or to avoid other potential shortcomings of the communications channels between the local border networks 18, traffic from a source 15A in a zone 12A that is targeted at a destination 17B in a different zone 17B is not egressed through the local TF system 100A onto the local border network 18A. Instead, the traffic is sent across the relatively broad pipe from local production network 14A in zone 12A to local production network 14B in zone 12B, egresses the local production network 14B through the TF system 100B in zone 12B, transits the local border network 18B of zone 12B to an ingress device 102B of zone 12B, enters the local production network 14B through the ingress device 102B, and is delivered to the target destination 17B via the local production network 14B.

FIG. 2A graphically illustrates converting IPv4 addresses to IPv6 addresses in outgoing packets, according to some embodiments. A TF system 100 as illustrated in FIGS. 1A through 1C may be configured to receive outgoing packets (e.g., IPv4 packets) from sources 15 (e.g., computation resources, servers, host systems, etc.) on a respective local production network 14, convert the packets to an IP address space used on the border network 90 (e.g., an IPv6 address space), and send the IP packets onto the local border network 18 for delivery to respective destinations 17 (e.g., endpoints such as computation resources, storage resources, servers, host systems, etc.). FIG. 2A illustrates a method for converting IPv4 addresses used on a local production network 14 to IPv6 addresses used on border network 90. As shown in FIG. 2A, IPv4 addresses are 32 bits, while IPv6 addresses are 128 bits. While IPv6 source and destination addresses are 128-bit addresses, the IPv6 subnet address space published by the TF system 100 may only occupy a portion of the address space (N bits), leaving the rest of the 128-bit addresses (128-N bits) free to be used for other purposes. An IPv6 subnet address portion of an IPv6 128-bit address may be referred to as an IPv6 prefix. As a non-limiting example, a 64-bit IPv6 prefix may be used in some embodiments, leaving 64 bits free for other uses. However, IPv6 prefixes of other sizes (e.g., 96-bit) may be used in some embodiments.

In some embodiments, a TF system 100 may convert outgoing packets from one IP packet format to another. For example, a packet received by a TF system 100 from a source 15 on the local production network 14 may be an IPv4 packet. The TF system 100 may form an IPv6 packet, and embed the IPv4 source address from the original IP packet in the IPv6 source address. IPv4 addresses are 32-bit addresses, while IPv6 addresses are 128-bit addresses, so the source address (the source IPv4 address) may be embedded as 32 bits of the 128-bit IPv6 packet header source address. The IPv6 subnet address of the source 15 may be determined from the IPv4 source address and put into the IPv6 source address as the IPv6 source prefix, as illustrated in FIG. 2A.

In some embodiments, the destination address in the header of the outgoing IPv6 packet may be set to indicate a destination IPv6 address. In some embodiments, an IPv6 address for the destination (or of an ingress border device 102 such as a load balancer or border router that fronts a local production network 14 that includes the destination endpoint) may be known by the TF system 100, or may be discovered using network address translation (NAT) technology or some other discovery method, and may be put into the IPv6 destination address of the outgoing packet as the IPv6 destination prefix. In some embodiments, the destination 17 may be on the same local production network 14 as the source 15, or may be on another local production network 14 that also implements a private IPv4 address range, and the IPv4 address of the destination 17 may be embedded in the IPv6 destination address of the outgoing packet.

FIG. 2B graphically illustrates converting IPv6 addresses to IPv4 addresses in incoming packets, according to some embodiments. Referring again to FIGS. 1A through 1C, a border device of a local production network 14 may be an ingress device 102 configured to receive incoming packets (e.g., IPv6 packets) via local border network 18, convert the packets to an IP address space used on the local production network 14 (e.g., an IPv4 address space), and send the IPv4 packets onto the local production network 14 for delivery to respective destinations 17 on the local production network 14. FIG. 2B illustrates a method for converting IPv6 addresses used on border network 90 to IPv4 addresses used on a local production network 14 for incoming packets. In some embodiments, a destination address of an incoming packet on the local production network 14 (e.g. a destination IPv4 address indicating a destination 17 on the local production network 14) may be embedded as 32 bits of the 128-bit IPv6 packet header destination address. An ingress device 102 may form an IPv4 packet for an incoming packet, and may set the IPv4 destination address in the IPv4 packet to the IPv4 destination address extracted from the IPv6 destination address in the incoming packet, as illustrated in FIG. 2B.

In some embodiments, a source IPv4 address of an incoming packet may be embedded in the 128-bit IPv6 packet header source address. In some embodiments, the source IPv4 address may be the endpoint IPv4 address of a source 15 on the local production network 14 that includes the destination 17, or of a source 15 on another local production network 14 that also implements a private IPv4 address range. The ingress device 102 may set the IPv4 source address in the IPv4 packet being formed for the local production network 14 to the IPv4 source address extracted from the IPv6 source address in the incoming packet, as illustrated in FIG. 2B.

While FIGS. 1A through 1C show a single TF system 100 and a single ingress device 102 acting as an ingress and egress device in each zone 12, in some embodiments ingress and egress to a local production network 14 may be controlled by more than two border devices. In some embodiments, two or more border devices may control ingress for a local production network 14. In some embodiments, two or more border devices may control egress for a local production network 14. In some embodiments, at least one border device may be configured to perform both ingress and egress functions for a local production network 14.

While FIGS. 1A through 1C show TF systems 100 acting as egress devices in the zones 12, in some embodiments a TF system 100 may also be configured to serve as an ingress device for the local production network 14. In these embodiments, an ingress device may implement a method for converting IPv6 addresses used on border network 90 to IPv4 addresses used on a local production network 14 for incoming packets, for example as shown in FIG. 2B, in addition to a method for converting IPv4 addresses to IPv6 addresses in outgoing packets as shown in FIG. 2A.

TF System Failure Handling

As previously noted, a TF system 100 in a zone 12 may advertise or publish an IPv6 subnet address space for the local production network 14 to the local border network 18 of the respective zone 12. In addition, the TF system 100 in a zone 12 may advertise routes for IPv4 subnets located in the same zone 12 and/or in other zones 12 or regions of the network 10 to the local production network 14. In addition, a TF system 100 may advertise routes to destinations in its respective zone 12 on the local production networks 14 of other zones 12. However, a TF system 100 in a zone 12 may fail or go offline for a variety of reasons. For example, one or more of the components of the TF system 100 (see, e.g., FIGS. 4A through 4D) may fail or be taken out of service. As another example, network components connecting the TF system 100 to the local production network 14 or local border network 18 may fail or be taken out of service.

Embodiments of methods and apparatus for handling failure of TF systems 100 in zones 12 are described in which connection requests from local sources 15 in a zone 12 to local destinations 17 in the zone 12 are gracefully and quickly responded to by TF systems 100 in other zones 12 of the network 10 if the local TF system 100 fails, rather than making the sources 15 wait for the connection requests to the local TF system 100 to timeout while "black holing" outgoing packets. In embodiments, low-priority routes to destinations in a zone 12 are advertised in the zone 12 by TF systems 100 in one or more other zones 12. If the TF system 100 in a zone 12 is down, a source 15 in the zone defaults to a low-priority route advertised by the TF system 100 in another zone 12 and sends a connection request to the remote TF system 100. However, instead of translating and forwarding the packets onto the border network 90, the remote TF system 100 in the other zone 12 responds with a reset message (e.g., a Transmission Control Protocol (TCP) reset (RST) packet) or other response message indicating that the destination is not reachable via the route so that the source 15 that sent the connection request is quickly informed that the target IP address is currently unreachable, and can take appropriate action.

Figure 3A:
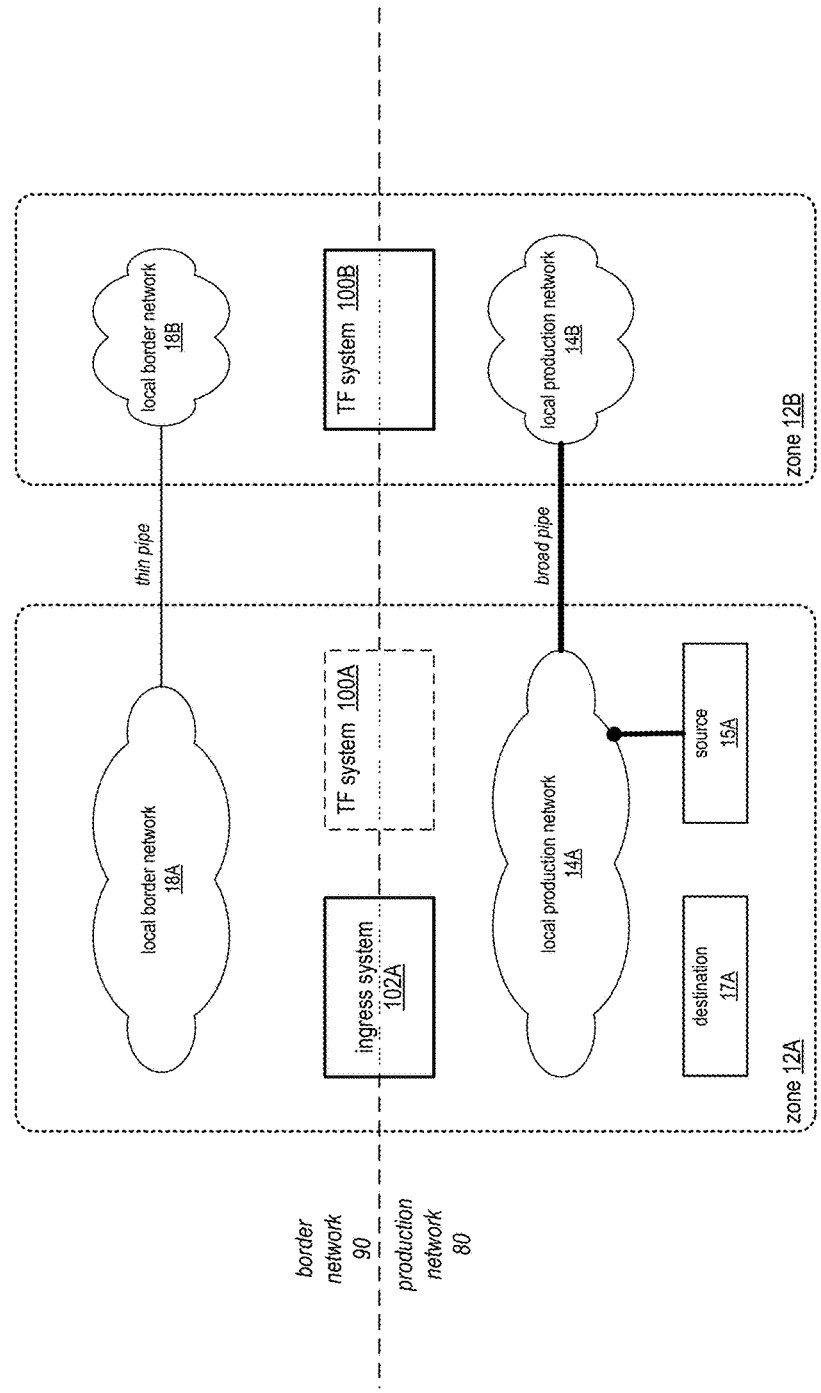
FIG. 3A graphically illustrates failure of the TF system in a zone, according to some embodiments.

FIG. 3A graphically illustrates failure of the TF system in a zone, according to some embodiments. In FIG. 3A, TF system 100A in zone 12A has gone down or become unreachable from sources on local production network 14A for some reason. Thus, the TF system 100A is not forwarding packets from the local production network 14A onto the local border network 18A, and is not advertising routes in zone 12A for traffic to be forwarded onto the border network 90. In addition, in FIG. 3A, TF systems 100 in other zones 12 (e.g., TF system 100B in zone 12B) are also not advertising routes in zone 12A. Source 15A has packets to send to destination 17A, which is in the same zone 12A as source 15A, but is in a different IPv4 subnet. However, since TF system 100 is down and thus no routes through TF system 100 onto the border network 90 are advertised or available, traffic is not deliverable from source 15A to destination 17A. Any connections or connection attempts from source 15A to destination 17A may eventually time out.

Figure 3B:
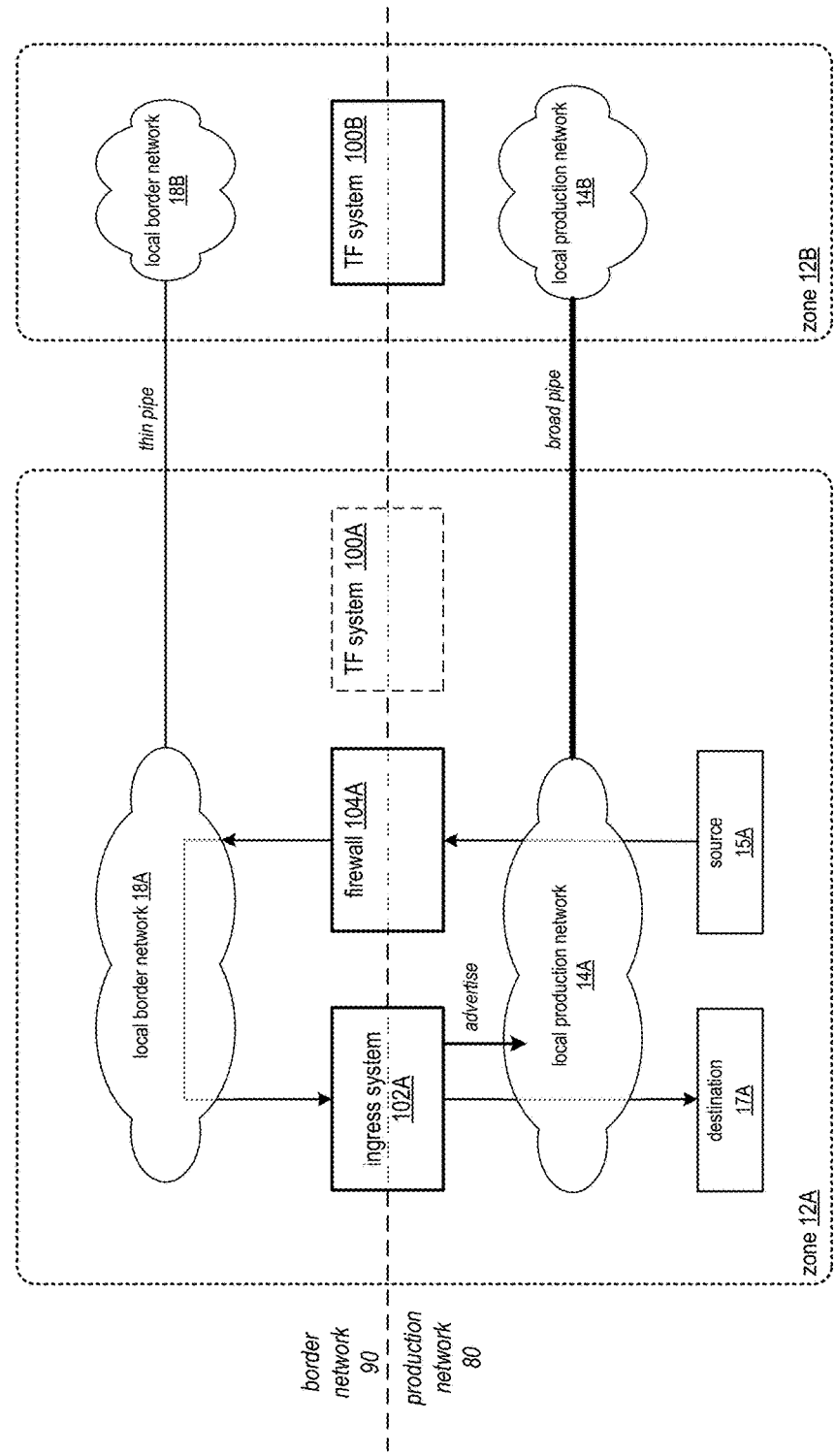
FIG. 3B graphically illustrates failure of a TF system in a zone resulting in traffic being sent across thin pipes through a firewall of the zone, according to some embodiments.

FIG. 3B graphically illustrates failure of a TF system in a zone resulting in traffic being sent across thin pipes through a firewall of the zone, according to some embodiments. In some embodiments, as shown in FIG. 3B, a firewall 104A or some other border device between the local production network 14A and the local border network 18A may advertise routes from source 15A through the border network 90 to destination 17A. Thus, source 15A may discover a route advertised by firewall 104A, and connect to destination 17A via the route. However, the communications channel or pipe from source 15A through firewall 104A into the border network 90 may typically be a relatively thin pipe with limited bandwidth. Thus, the pipe may be overwhelmed by traffic from sources 15 in zone 12A to destinations 17 in zone 12A when TF system 100A is unavailable, possibly resulting in network failures such as high latency, dropped packets, and so on.

Figure 3C:
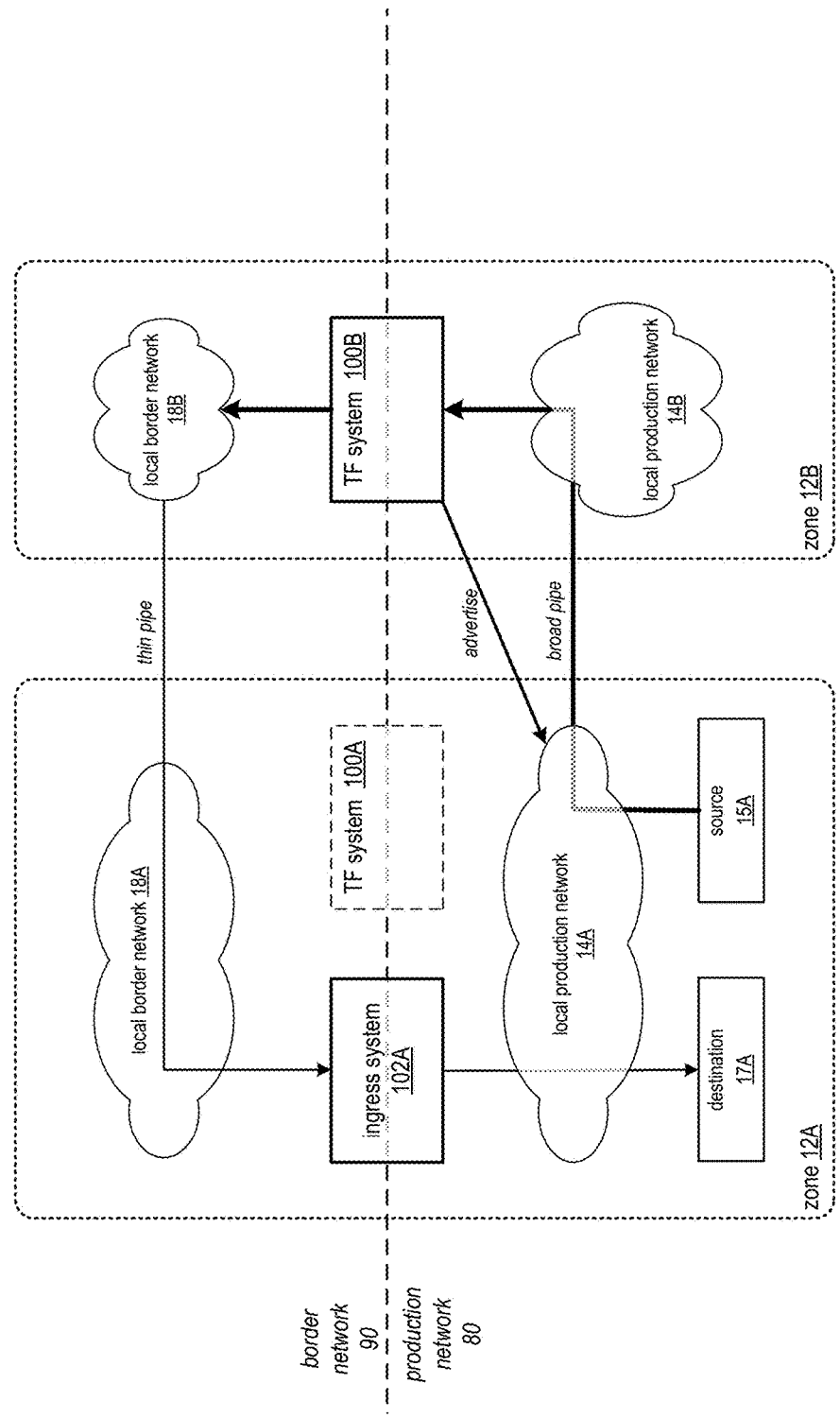
FIG. 3C graphically illustrates failure of a TF system in a zone resulting in traffic being sent across thin pipes between border networks of zones, according to some embodiments.

FIG. 3C graphically illustrates failure of a TF system in a zone resulting in traffic being sent across thin pipes between border networks of zones, according to some embodiments. In FIG. 3C, TF system 100A in zone 12A has failed. However, TF system 100B in zone 12B advertises route(s) onto the border network 90 in zone 12A. Source 15A has packets to send to destination 17A, which is in the same zone 12A as source 15A, but is in a different IPv4 subnet. Source 15A discovers a route advertised by TF system 100B. Traffic from source 15A to destination 15A is sent across a communications channel or pipe from local production network 14A in zone 12A to local production network 14B in zone 12B, egresses the local production network 14B through the TF system 100B in zone 12B, is forwarded to local border network 18A over a pipe connecting the local border network 18B to local border network 18A, enters local production network 14A via ingress system 102A, and is delivered to the destination 17A. However, the pipe connecting the local border network 18B to local border network 18A may typically be a relatively thin pipe with limited bandwidth. The pipe may be overwhelmed by traffic from sources 15 in zone 12A to destinations 17 in zone 12A when TF system 100A is unavailable, possibly resulting in network failures such as high latency, dropped packets, and so on. In addition to being thin pipes, the communications channels between local border networks 18 may traverse external networks such as the Internet, and may be more expensive to use, less secure, or may be otherwise less desirable to use for traffic between sources 15 and destinations 17 on the production network 80.

Figure 3D:
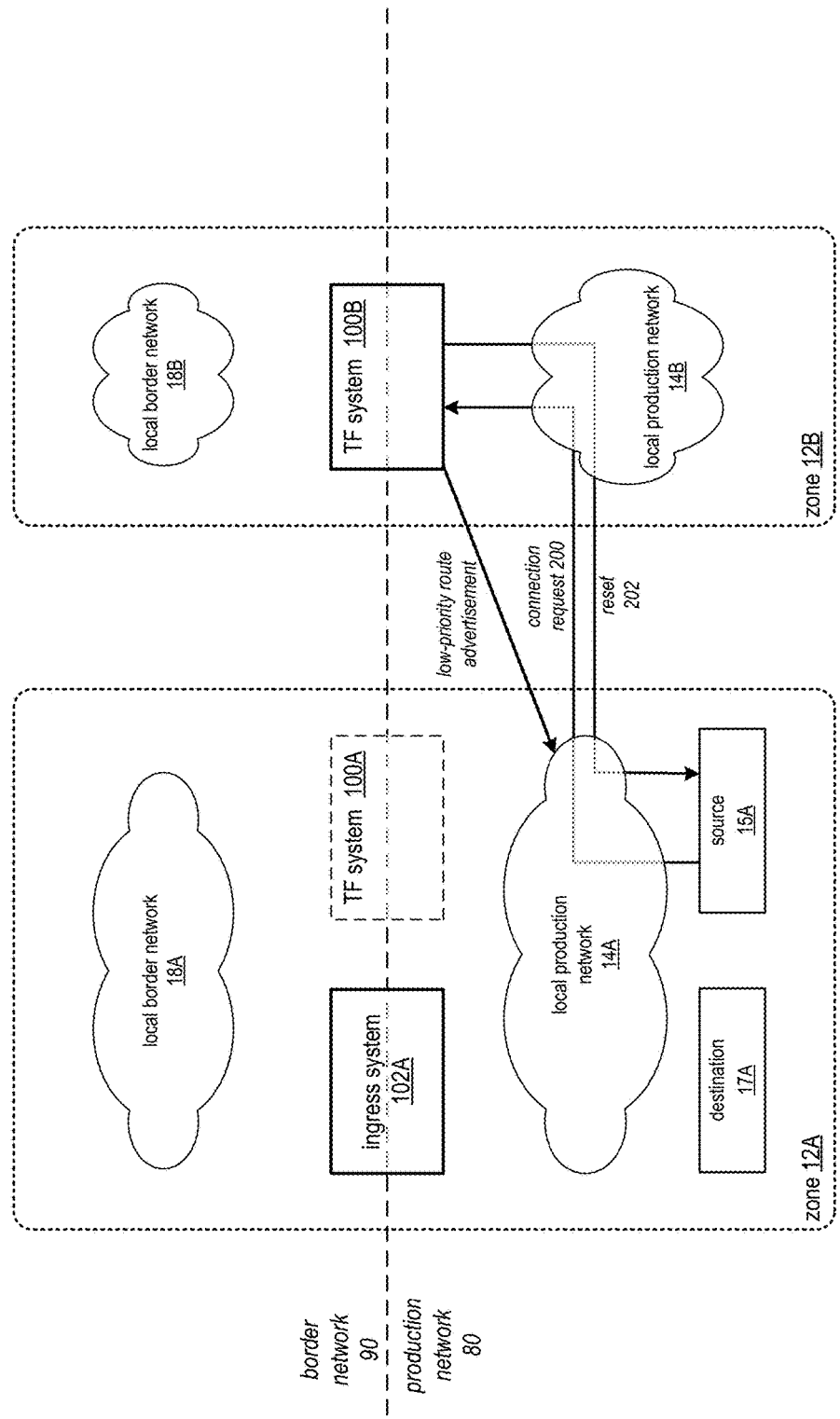
FIG. 3D graphically illustrates a method for handling failure of a TF system in a zone, according to some embodiments.

FIG. 3D graphically illustrates a method for handling failure of a TF system in a zone, according to some embodiments. The TF system failure handling method may prevent packets sent from a local source 15 in a zone 12 to a local destination 17 in the same zone 12 from traversing the relatively thin pipes between the local border networks 18 in the zones 12 when the TF system 100 in the source 15's zone 12 fails, as illustrated in FIG. 3C. In addition, the TF system failure handling method as described herein may quickly notify a source 15 that no route to a destination 17 in the same zone 12 is available, so that the connection failure is discovered by the source 15 without having to wait for a timeout as shown in FIG. 3A. In addition, the TF system failure handling method as described herein may avoid sending traffic from local sources 15 in a zone to local destinations 17 in the zone through firewalls or other network devices in the zone that may be overwhelmed by the traffic, as shown in FIG. 3B.

As shown in FIG. 3D, TF system 100A in zone 12A has gone down or become unreachable from sources on local production network 14A for some reason. Thus, the TF system 100A is not forwarding packets from the local production network 14A onto the local border network 18A, and is not advertising routes in zone 12A for traffic to be forwarded onto the border network 90. However, in FIG. 3D, TF system 100B in zone 12B advertises low-priority routes to destinations 17 in zone 12A to the sources 15 in zone 12A.

Source 15A has packets to send to destination 17A, which is in the same zone 12A as source 15A, but is in a different IPv4 subnet. Since no higher-priority routes onto the border network 90 are advertised by TF system 100A, source 15A defaults to a lower-priority route advertised by TF system 100B, and sends a connection request 200 to TF system 100B via the connection or pipe between local production network 14A and local production network 14B. TF system 100B receives the connection request 200, and recognizes that the connection request 200 was received over one of its low-priority routes advertised in another zone 12A. Since the request 200 was received over the low-priority route from zone 12A, instead of translating and forwarding the traffic onto the local border network 18B to be forwarded to local border network 18A through the relatively thin pipe connecting the two border networks 18 as shown in FIG. 3C, the TF system 100B responds to the connection request 200 via the connection to the local production network 14A, for example with a reset 202 response message, to let source 15A know that there is no route available to the specified IP address (i.e., the address of the target destination 17A). The source 15 may then take some action to resolve the problem on its end, for example selecting another target destination 17 (e.g., a destination 17B in a different zone 12) to which a high-priority route (e.g., a route as shown in FIG. 1C) may be available.

Using the TF system failure handling method as shown in FIG. 3D, source 15A does not have to wait for a timeout as shown in FIG. 3A, and traffic is not routed to the destination over the relatively thin pipe between the two border networks 18 as shown in FIG. 3C. In addition to being thin, the pipe between the local border networks 18 may traverse external networks such as the Internet, may be more expensive to use, less secure, or may be otherwise less desirable to use for traffic between sources 15 and destinations 17 on the production network 80. In addition, traffic is not sent from local sources 15 in a zone to local destinations 17 in the zone through firewalls or other network devices in the zone that may be overwhelmed by the traffic, as shown in FIG. 3B.

Referring to FIG. 1A, in some embodiments, a set of zones 12 (e.g., the three zones 12A-12C) may each be configured with enough spare bandwidth capacity in their TF systems 100 to handle traffic from at least one failed TF system 100/zone 12. If the TF system 100 in a zone 12 fails or is taken out of service, the TF systems 100 in one or more other zones 12 may thus have enough spare bandwidth capacity to handle the failover traffic for the zone 12. Thus, when sources 15 in the zone 12 with the failed TF system 100 select target destinations 17 in the other zones 12, the other zones 12 are not overwhelmed with traffic. In some embodiments, if the TF system 100 in a second zone loses bandwidth capacity due to TF server/TF unit failures such that the TF system 100 cannot reliably handle its portion of the traffic, the second TF system 100/zone may also be taken out of service, and the zone's traffic may be routed through the remaining zone(s). However, in some embodiments, an unhealthy TF system 100 (e.g., a TF system 100 that cannot reliably handle its portion of the traffic due to TF server/TF unit failures) may remain in service to continue to handle as much traffic as possible if removing the TF system 100 from service would result in the remaining zone(s) receiving more traffic than their TF systems 100 can reliably handle.

Figure 4:
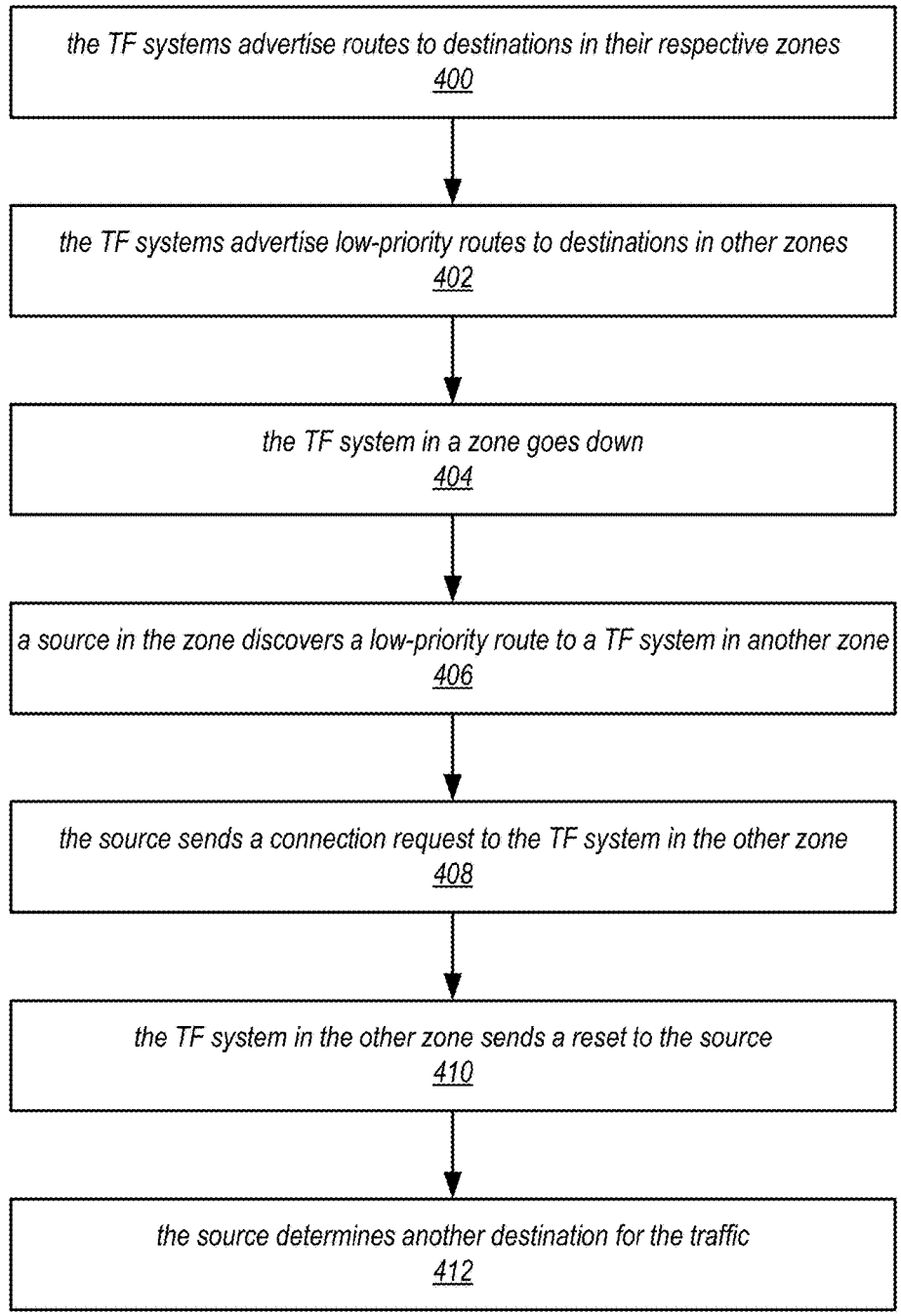
FIG. 4 is a flowchart of a method for handling failure of a TF system in a zone, according to some embodiments.

FIG. 4 is a flowchart of a method for handling failure of a TF system in a zone, according to some embodiments. The method of FIG. 4 may, for example, be implemented in networks 10 as illustrated in FIGS. 1A through 1C and FIGS. 3A through 3D.

As indicated at 400 of FIG. 4, TF systems 100 may advertise routes to destinations 17 in their respective zones 12. In some embodiments, a TF system 100 may advertise the routes on its respective local production network 14, for example as shown in FIG. 1B. In some embodiments, a TF system 100 in a zone 12 may also advertise routes to its local destinations 17 on other production networks 14 in other zones 12, for example as shown in FIG. 1C.

As indicated at 402 of FIG. 4, at least one TF system 100 may advertise low-priority routes to destinations 17 in other zones 12. For example, as shown in FIG. 3D, TF system 100B in zone 12B may advertise low-priority routes to destinations 15A in zone 12A.

As indicated at 404 of FIG. 4, a TF system 100 in a zone 12 may go down or may otherwise become unreachable by sources 15 in its respective zone 12, for example as shown in FIG. 3D. Thus, the TF system 100 is not forwarding packets from the local production network 14 onto the local border network 18, and is not advertising routes in its respective zone 12 for traffic to be forwarded onto the border network 90.

As indicated at 406 of FIG. 4, the source discovers a low-priority route advertised by a TF system in another zone. For example, the source may have packets to send to a destination 17 in the same zone 12 as the source, but in a different IPv4 subnet. Since the TF system in the zone is down and no higher-priority routes onto the border network 90 are advertised in the zone, the source defaults to a lower-priority route advertised by a TF system in another zone.

As indicated at 408 of FIG. 4, the source sends a connection request to the TF system in the other zone via the connection between the production networks 14 in the respective zones.

As indicated at 410 of FIG. 4, the TF system in the other zone sends a reset or other response to the source that sent the connection request for the low-priority route. The TF system 100 receives the connection request from the source, and recognizes that the connection request was received over one of its low-priority routes advertised in another zone. Since the request 200 received over the low-priority route, instead of translating and forwarding the traffic onto its local border network 18 to be forwarded to the local border network of the source's zone through the relatively thin pipe connecting the two border networks 18 as shown in FIG. 3C, the TF system 100 responds to the connection request with a response message such as a reset. The response message to the connection request may inform the source 15 that there is no route currently available to the specified IP address (i.e., the address of the target destination 17). Thus, the source 15 does not have to wait for a timeout as shown in FIG. 3A, and traffic is not routed to the destination over the relatively thin pipe between the two border networks 18 as shown in FIG. 3C. In addition to being thin, the pipe between the local border networks 18 may traverse external networks such as the Internet, and may be more expensive to use, less secure, or may be otherwise less desirable to use for traffic between sources 15 and destinations 17 on the production network 80. In addition, traffic is not sent from local sources 15 in a zone to local destinations 17 in the zone through firewalls or other network devices in the zone that may be overwhelmed by the traffic, as shown in FIG. 3B.

As indicated at 412 of FIG. 4, the source 15 may then take some action to resolve the problem on its end, for example by selecting another target destination 17 (e.g., a destination 17 in a different zone 12) to which a high-priority route (e.g., a route as shown in FIG. 1C) may be available.

Example TF System Implementation

FIGS. 5A through 5D illustrate components of an example traffic forwarding (TF) system, according to some embodiments. A TF system 500 as illustrated in FIGS. 5A through 5D may, for example, be implemented as an egress device between production networks 14 and border networks 18 in zones 12 of a network 10 as illustrated in FIGS. 1A through 1C. Note that FIGS. 5A through 5D are logical representations of a TF system 500 and its components, and are not physical representations; a TF system 500 and its components may be realized via various physical implementations.

Figure 5A:
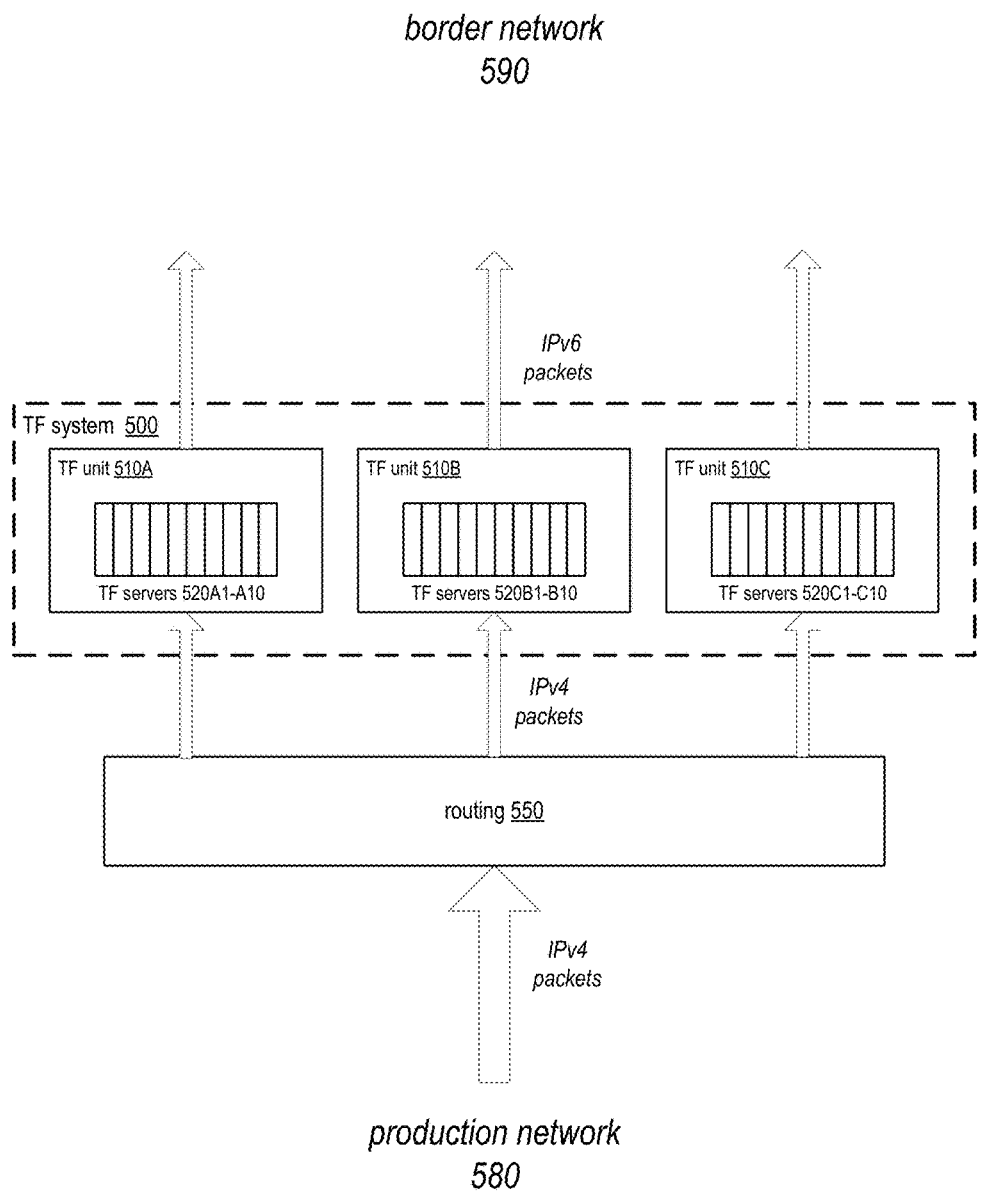
FIG. 5A graphically illustrates an example TF system including two or more TF units, according to at least some embodiments.

FIG. 5A graphically illustrates an example TF system including two or more TF units in a zone, according to at least some embodiments. As shown in FIG. 5A, a TF system 500 is a traffic forwarding system that handles egress of traffic from a production network 580 of a network onto a border network 590 of the network for delivery to endpoints via one or more intermediate networks. The endpoints that the TF system 500 forwards traffic to may be local to the zone or region of the network, or may be remote.

A TF system 500 may, for example, be implemented as an egress device between a local production network and a local border network in a zone of a network as illustrated in FIGS. 1A through 1C. In at least some embodiments, the TF system 500 may advertise or publish an IPv6 subnet address space for the local production network to the local border network of the respective zone. In some embodiments, the TF system 50 may also advertise routes for IPv4 subnets located in the same zone and/or in other zones or regions of the network to the local production network. In addition, a TF system 500 may advertise routes to destinations in its respective zone on the local production networks of other zones.

In some embodiments, the TF system 500 employs a stateless forwarding protocol that encapsulates IPv4 packets in IPv6 packets, embedding the IPv4 source and destination addresses in the IPv6 source and destination addresses, for example as illustrated in FIG. 2A. At the destinations (e.g., at ingress border devices), the IPv6 packets are received and the IPv4 packets are decapsulated; the IPv4 source and destination addresses are extracted from the IPv6 source and destination addresses, for example as illustrated in FIG. 2B. While embodiments are primarily described as employing a stateless forwarding protocol that involves IPv6-based encapsulation, other types of forwarding mechanisms may be used, such as Genetic Routing Encapsulation (GRE) tunneling.

As shown in FIG. 5A, in some embodiments, a TF system 500 may include two or more clusters of TF servers 520, referred to as TF units 510, with each TF unit 510 including two or more TF servers 520. This non-limiting example shows three TF units 510A-510C in TF system 500, with each TF unit 510 including ten TF servers 520 (TF servers 520A1-A10 corresponding to TF unit 510A, TF servers 520B1-B10 corresponding to TF unit 510B, and TF servers 520C1-C10 corresponding to TF unit 510C). However, a TF system 500 in a zone may include tens or even hundreds of TF units 510. In at least some embodiments, each TF server 520 includes two or more network interface controllers (NICs) and implements TF logic to provide some amount of egress bandwidth for forwarding traffic (e.g., 10 Gbps per production-facing NIC) and some amount of bandwidth for receiving response traffic (e.g., 10 Gbps per border-facing NIC). The total bandwidth capacity for outbound (egress) traffic through a TF unit 510 is the sum of the egress bandwidth capacity for its TF servers 520, and the total bandwidth capacity for egress traffic through a TF system 500 is the sum of the egress bandwidth capacity for its TF units 510. Similarly, the total bandwidth capacity for inbound (ingress) traffic through a TF unit 510 is the sum of the ingress bandwidth capacity for its TF servers 520, and the total bandwidth capacity for ingress traffic through a TF system 500 is the sum of the ingress bandwidth capacity for its TF units 510.

Routing technology 550 of the local production network distributes the outbound (egress) traffic among the TF units 510 in the TF system 500, for example according to an ECMP (equal-cost multi-path) routing technique that spreads egress traffic across the TF units 510 in the TF system 500, with each TF unit 510 responsible for processing and forwarding its allocated portion of the egress traffic. Each TF unit 510 includes routing technology that in turn distributes its portion of the egress traffic among the TF servers 520 in the respective unit 510, for example according to an ECMP routing technique, with each TF server 520 responsible for processing and forwarding its allocated portion of the egress traffic. Typically, the TF system 500 is configured so that the amount of egress traffic distributed by the routing technology 550 among the TF units 510 is less than the total egress bandwidth capacity for the TF system 500, the amount of egress traffic distributed among the TF servers 520 in each TF unit 510 is less than the total egress bandwidth capacity for the respective TF unit 510, and the amount of egress traffic distributed to each TF server 520 in a TF unit is less than the total egress bandwidth capacity for the respective TF server 520.

While FIG. 5A shows a TF system 500 handing outbound traffic from the production network 580, in some embodiments a TF system 500 may also receive and process inbound (ingress) IPv6 traffic from the border network 590. In these embodiments, inbound IPv6 packets are received from the border network 590, the IPv4 packets are decapsulated from the IPv6 packets, and the IPv4 packets are sent to endpoints on the production network 580 as indicated by the IPv4 destination addresses embedded in the IPv6 headers, for example as illustrated in FIG. 2B. Routing technology of the local border network distributes the inbound (ingress) traffic among the TF units 510 in the TF system 500, for example according to an ECMP routing technique that spreads ingress traffic across the TF units 510 in the TF system 500, with each TF unit 510 responsible for processing and forwarding its allocated portion of the ingress traffic. Each TF unit 510 includes routing technology that in turn distributes its portion of the ingress traffic among the TF servers 520 in the respective unit 510, for example according to an ECMP routing technique, with each TF server 520 responsible for processing and forwarding its allocated portion of the ingress traffic. Typically, the TF system 500 is configured so that the amount of ingress traffic distributed by the routing technology 550 among the TF units 510 is less than the total ingress bandwidth capacity for the TF system 500, the amount of ingress traffic distributed among the TF servers 520 in each TF unit 510 is less than the total ingress bandwidth capacity for the respective TF unit 510, and the amount of ingress traffic distributed to each TF server 520 in a TF unit is less than the total ingress bandwidth capacity for the respective TF server 520.

Figure 5B:
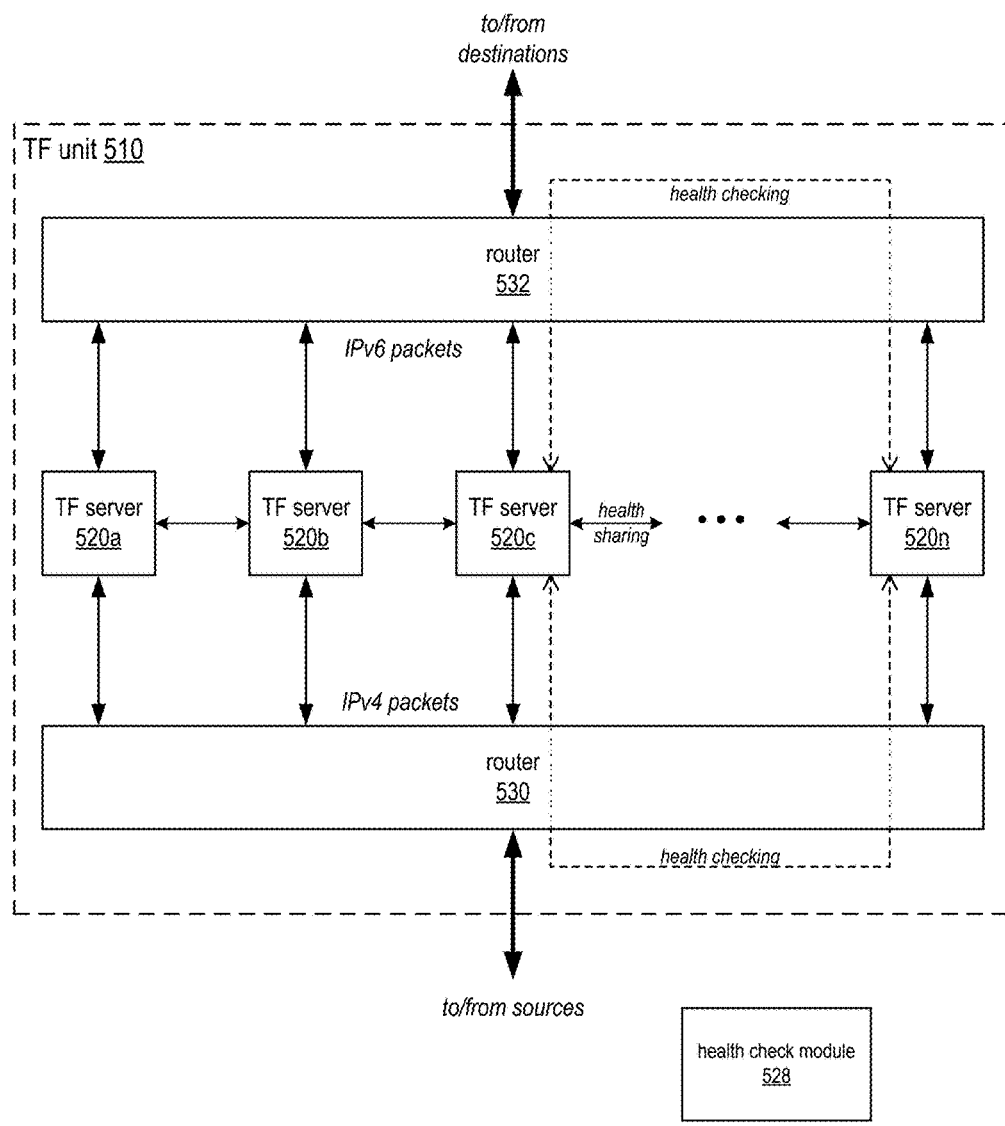
FIG. 5B graphically illustrates an example TF unit including two or more TF servers, according to at least some embodiments.

FIG. 5B graphically illustrates an example TF unit 510, according to at least some embodiments. As shown in FIG. 5B, a TF unit 510 may include two or more TF servers 520a-520n, a production-side router 530, and a border-side router 532. Production-side router 530 distributes outbound IPv4 traffic from sources on production network 580 among the TF servers 520a-520n, for example according to an ECMP routing technique, and sends inbound IPv4 traffic onto the local production network for delivery to target endpoints on the production network 590 as indicated by the IPv4 packet destination addresses. Border-side router 532 sends outbound IPv6 traffic from the TF servers 520a-520n onto the border network 590, and distributes inbound IPv6 traffic received from external sources among the TF servers 520a-520n, for example according to an ECMP routing technique.

In at least some embodiments, each TF server 520 in a TF unit 510 may be configured to receive outgoing (egress) packets (e.g., IPv4 packets) from router 530, convert the packets to an IP address space used on the border network 590 (e.g., an IPv6 address space), and send the IP packets onto the border network 590 via router 532 for delivery to respective destinations (e.g., endpoints such as storage resources, servers, host systems, etc.). FIG. 2A graphically illustrates a method for translating IPv4 addresses to IPv6 addresses in outgoing packets, according to at least some embodiments.

In at least some embodiments, each TF server 520 in a TF unit 510 may also be configured to receive incoming (ingress) packets (e.g., IPv6 packets) from router 532, convert the packets to an IP address space used on the production network 580 (e.g., an IPv4 address space), and send the IP packets onto the production network 580 via router 530 for delivery to respective destinations (e.g., endpoints such as storage resources, servers, host systems, etc.). FIG. 2B graphically illustrates a method for translating IPv6 addresses to IPv4 addresses in incoming packets, according to at least some embodiments.

In at least some embodiments, the TF servers 520 in a TF unit 510 may implement a health check protocol to monitor health of the TF servers 520 in the unit 510 and to detect healthy and unhealthy or unavailable TF servers 520. In some embodiments, each TF server 520 in a TF unit 510 may monitor its own health, and may also monitor the health of one or more other TF servers 520 in the unit 510. In some embodiments, health checking a TF server 520 may include using health check pings sent to the NICs of a TF server 520 from the NICs of at least one other TF server 520 in the TF unit 510. The pings may be used to verify that network paths to and from the NICs on a given server 520 are operational, and to verify that the NICs themselves are operational. If one or more of the NICs in a TF server 520 do not respond to the pings for a specified period, the other server(s) 520 may record in their local health information that the TF server 520 is unhealthy, unreachable, or out of service. In some embodiments, the health check protocol may involve each TF server 520 monitoring its own health; if a TF server 520 detects that it is unhealthy (e.g., that the TF server 520 can no longer reliably handle its portion of the egress and/or ingress traffic bandwidth, or that one or more monitored components of the server 520 are experiencing problems or generating errors), the TF server 520 may inform one or more others of the TF servers 520 in the TF unit 510 that it is unhealthy. In some embodiments, an unhealthy TF server 520 may take itself out of service. However, an unhealthy TF server 520 may simply fail, or a TF server 520 (whether healthy or unhealthy) may be taken out of service by some other entity. In some embodiments, the TF servers 520 in a TF unit 510 may locally store health information, and may propagate the health information to other TF servers 520 in the respective TF unit 510, for example using a gossip protocol. This health information may include information about their own health and information about the health of one or more other TF servers 520. In some embodiments, TF server 520's health information may also be shared with routers 530 and 532 in the respective TF unit 510.

In at least some embodiments, each TF server 520 in a TF unit 510 includes two or more network interface controllers (NICs) and implements TF logic to provide some amount of bandwidth for forwarding traffic (e.g., 10 Gbps per NIC). The total bandwidth capacity for outbound (egress) traffic through a TF unit 510 is the sum of the egress bandwidth capacity for its healthy TF servers 520. Similarly, the total bandwidth capacity for inbound (ingress) traffic through a TF unit 510 is the sum of the ingress bandwidth capacity for its healthy TF servers 520. In an example, non-limiting configuration, a healthy TF unit 510 may include eight healthy TF servers 520, each sever 520 including a pair of 10 Gbps NICs, with one NIC facing the production network 580 and the other facing the border network 590, thus providing egress bandwidth capacity of 80 Gbps, ingress bandwidth capacity of 80 Gbps, and bi-directional (ingress+ egress) bandwidth capacity of 160 Gbps for the TF unit 510.

Figure 5C:
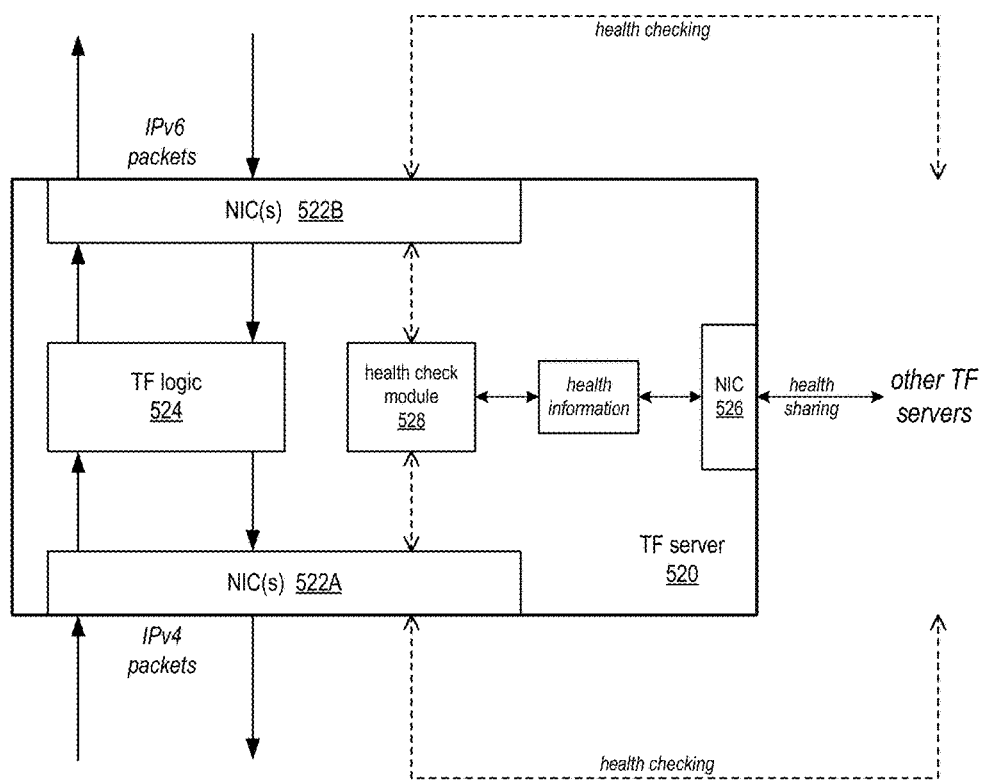
FIG. 5C graphically illustrates an example TF server, according to some embodiments.

FIG. 5C graphically illustrates an example TF server 520, according to some embodiments. TF server 520 may include one or more network interface controllers (NICs) 522A on the production network 580 side, and one or more NICs 522B on the border network 590 side. NIC(s) 522A may receive outbound IPv4 traffic from the production network 580 and transmit inbound IPv4 traffic onto the production network 580. NIC(s) 522B may receive inbound IPv6 traffic from the border network 590 and transmit outbound IPv6 traffic onto the border network 590.

Traffic forwarding (TF) logic 524 between NICs 522A and 522B may convert outbound packets (e.g., IPv4 packets) received from NIC(s) 522A to an IP address space used on the border network 590 (e.g., an IPv6 address space). FIG. 2A graphically illustrates a method for translating IPv4 addresses to IPv6 addresses in outbound packets, according to at least some embodiments. TF logic 524 may also convert incoming packets (e.g., IPv6 packets) received from NIC(s) 522B to an IP address space used on the production network 580 (e.g., an IPv4 address space). FIG. 2B graphically illustrates a method for translating IPv6 addresses to IPv4 addresses in incoming packets, according to at least some embodiments. TF logic 524 may be implemented in hardware, as software, or as a combination thereof.

In at least some embodiments, TF server 520 provides a maximum amount of bandwidth for egress traffic (e.g., 10 Gbps per NIC 522A), and a maximum amount of bandwidth for ingress traffic (e.g., 10 Gbps per NIC 522B).

In some embodiments, TF server 520 may also include a health check module 528 that may implement a health check protocol to monitor the health of the TF server 520 and of other TF servers 520 in the same TF cluster or unit. In some embodiments, a TF server 520 may also include one or more NICs 526 that may, for example, be used in communicating with other TF servers 520 and/or routers 530 and 532 in the TF unit 510, for example for sharing health information determined according to a health check protocol implemented by the health check module 528.

In at least some embodiments, TF server 520 may participate in a health check protocol with other TF servers in its TF cluster or unit to monitor the health and availability of the TF servers in the unit. In some embodiments, TF server 520 may monitor its own health, and may also monitor the health of one or more other TF servers in its unit. In some embodiments, the TF server 520 may include a health check module 528 that implements the health check protocol on the server 520. In some embodiments, health checking another TF server in the TF unit may involve using health check pings sent to the NICs of the other TF server from the NICs 522A and 522B of TF server 520. The pings may be used to verify that network paths to and from the NICs of the other server are operational, and to verify that the NICs on the other TF server are operational. If one or more of the NICs of the other TF server do not respond to the pings for a specified period, the TF server 520 may record in its local health information that the other TF server is unhealthy or out of service.

In some embodiments, the health check protocol may involve the health check module 528 monitoring the health of TF server 520; if the health check module 528 detects that the TF server 520 is unhealthy (e.g., that the TF server 520 can no longer reliably handle its portion of the egress traffic bandwidth), the health check module 528 may inform one or more other TF servers in the unit that it is unhealthy. In some embodiments, if the health check module 528 detects that TF server 520 is unhealthy, the unhealthy TF server 520 may take itself out of service, or may be taken out of service. In some embodiments, the TF server 520 may locally store health information, and may share health information with other TF servers in its unit via one or more NICs 526, for example using a gossip protocol. In some embodiments, TF server 520 may also share health information with other components in its unit such as routers 530 and 532 as shown in FIG. 5B, for example via one or more NICs 526.

Figure 5D:
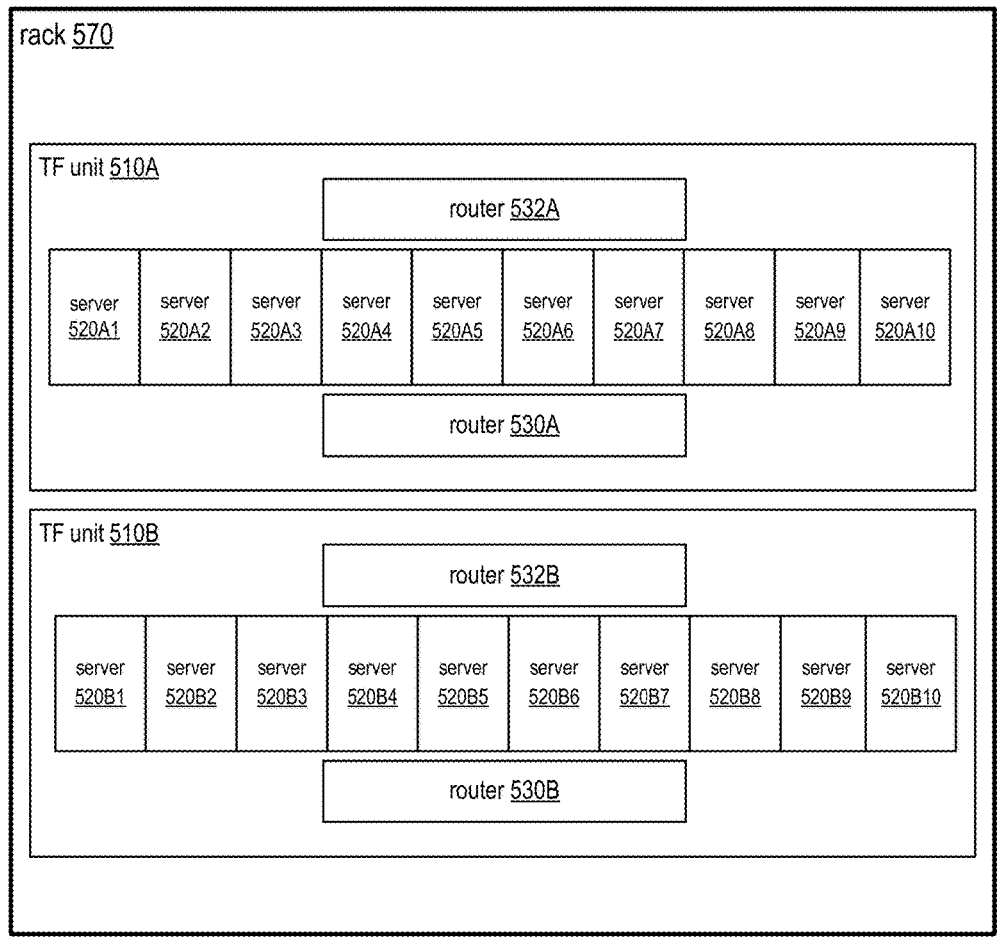
FIG. 5D graphically illustrates an example rack that may include one or more TF units, according to at least some embodiments.

FIG. 5D graphically illustrates an example rack 570 that may include one or more TF units 510 of a TF system 500, according to at least some embodiments. As shown in FIG. 5D, TF units 510 as illustrated in FIG. 5B may be rack-mounted units 510, with one or more units 510 included in a rack 570. Each unit 510 may include two or more TF servers 520, a production network-facing router 530, and a border network-facing router 532. In this example, rack 570 includes two TF units 510A and 510B, each TF unit 510 including ten TF servers 520, shown as 520A1-A10 and 520B1-B10, respectively. A zone or data center may include two or more racks 570, each rack 570 including one or more TF units 510 of a TF system 500 as illustrated in FIG. 5A.

TF Server Failure Handling

In some embodiments, as illustrated in FIGS. 5A through 5D, a TF system 500 in a zone may include two or more TF units 510, with each TF unit 510 including multiple TF servers 520. As shown in FIG. 5A, outbound (egress) traffic from the local production network may be distributed among the TF units 510, for example according to an ECMP routing technique, with each TF unit 510 responsible for an allocated portion of the egress traffic. In some embodiments a TF system 500 may also receive and process inbound (ingress) IPv6 traffic from the border network 590. The ingress traffic may also be distributed among the TF units 510, for example according to an ECMP routing technique, with each TF unit 510 responsible for an allocated portion of the ingress traffic. As shown in FIG. 5B, each TF unit 510 includes routing technology that in turn distributes its allocated portion of the egress and ingress traffic among the TF servers 520 in the respective unit 510, for example according to an ECMP routing technique, with each TF server 520 responsible for processing and forwarding its allocated portion of the egress and ingress traffic.

Typically, a TF system 500 may be configured so that the amount of egress traffic distributed among the TF units 510 is less than the total egress bandwidth capacity for the TF system 500, the amount of egress traffic distributed among the TF servers 520 in a TF unit 510 is less than the total egress bandwidth capacity for the respective TF unit 510, and the amount of egress traffic distributed to each TF server 520 in a TF unit is less than the total egress bandwidth capacity for the respective TF server 520. Similarly the TF system 500 may be configured so that the amount of ingress traffic distributed among the TF units 510 is less than the total ingress bandwidth capacity for the TF system 500, the amount of ingress traffic distributed among the TF servers 520 in a TF unit 510 is less than the total ingress bandwidth capacity for the respective TF unit 510, and the amount of ingress traffic distributed to each TF server 520 in a TF unit is less than the total ingress bandwidth capacity for the respective TF server 520. This helps to ensure that the TF system 500 can handle the bi-directional traffic for its zone with low latency and without packet losses and retransmissions due to congestion, while providing surplus bandwidth capacity to handle peak loads, equipment failure, maintenance downtime, networking problems, and the like.

In an example configuration, a TF unit 510 may include eight TF servers 520, each sever 520 including a pair of 10 Gbps NICs, thus providing egress bandwidth capacity of 80 Gbps, ingress bandwidth capacity of 80 Gbps, and bi-directional (ingress+egress) bandwidth capacity of 160 Gbps for the TF unit 510. Typically, this example TF system 500 may be configured so that the amount of egress or ingress traffic allocated to the TF unit 510 is less than 80 Gbps (e.g., 60 Gbps), and thus the amount of egress or ingress traffic allocated to each server 520 in the unit 510 is less than the bandwidth capacity of its NICs (10 Gbps each).

However, TF servers 520 in a TF unit 510 may become unhealthy, fail, be taken offline or out of service, or become unreachable for some reason (e.g., a network failure). With extra bandwidth capacity built into the TF unit 510 as described above, failure of one or a few servers 520 in the unit 510 may be absorbed by the other servers 520 in the unit 510, as the egress and/or ingress traffic can be redistributed to the remaining servers 520. However, failure of some threshold number of servers 520 in a unit may result in the other servers 520 no longer being able to handle the unit 510's allocated portion of the egress and/or ingress traffic, possibly resulting in congestion-related delays, high latency, packet losses, and other problems on connections through the TF unit 510.

Embodiments of methods and apparatus for handling failure of TF servers 520 in TF units 510 of a TF system 500 are described in which the health of the TF servers 520 in a TF unit 510 is monitored, for example according to a health check protocol implemented by the TF servers 520 in the TF unit 510, to detect TF servers 520 in the TF unit 510 that are not healthy or not online. If the health of the TF servers 520 in a TF unit 510 is detected to have dropped below a threshold at which the TF unit 510 cannot reliably handle its allocated portion of the egress and/or ingress traffic, then the TF servers 520 in the TF unit 510 may automatically stop advertising routes or otherwise remove the TF unit 510 from active service in the TF system 500. The egress traffic from the local production network and the ingress traffic from the local border network may then be re-allocated across the remaining TF units 510 in the TF system 500, for example according to an ECMP routing technique. In at least some embodiments, the remaining TF units 510 in the TF system 500 may include healthy TF servers 520 that provide enough spare capacity to handle the additional share of the traffic. Having the TF servers in a TF unit take the unhealthy TF unit 510 out of service in the TF system 500 rather than allowing the TF unit 510 to continue attempting to process and forward its allocated portion of the traffic may help prevent congestion-related delays, high latency, packet losses, and other problems on connections through the unhealthy TF unit 510.

Note that it is possible that all the TF units 510 in a TF system 500 of a zone may become unavailable, for example by taking themselves out of service due to server 520 failures. If this happens, then a method for handling a TF system failure in a zone as illustrated in FIGS. 3A-3D and FIG. 4 may be performed. In addition, in some embodiments, if enough TF units 510 in a TF system 500 of a zone go down or take themselves out of service so that the remaining TF units 510 in the zone cannot reliably handle the egress and/or ingress traffic for the zone, then the TF system 500 for the zone may go out of service, and a method for handling a TF system failure in a zone as illustrated in FIGS. 3A-3D and FIG. 4 may be performed. In some embodiments, if the TF system 500 in a second zone loses bandwidth capacity due to TF server 520/TF unit 510 failures such that the TF system 500 cannot reliably handle its traffic bandwidth, the second TF system 500/zone may also go out of service, and the zone's traffic may be routed through the remaining zone(s). However, in some embodiments, an unhealthy TF system 500 (e.g., a TF system 500 that cannot reliably handle its portion of the traffic due to TF server 520/TF unit 510 failures) may remain in service to continue to handle as much traffic as possible if removing the TF system 500 from service would result in the remaining zone(s) receiving more traffic than their TF systems 500 can reliably handle. In these cases, at least some TF units 510 with TF server 520 failures may be kept in service even if the TF units 510 cannot reliably handle their portion of the traffic bandwidth.

Figure 6A:
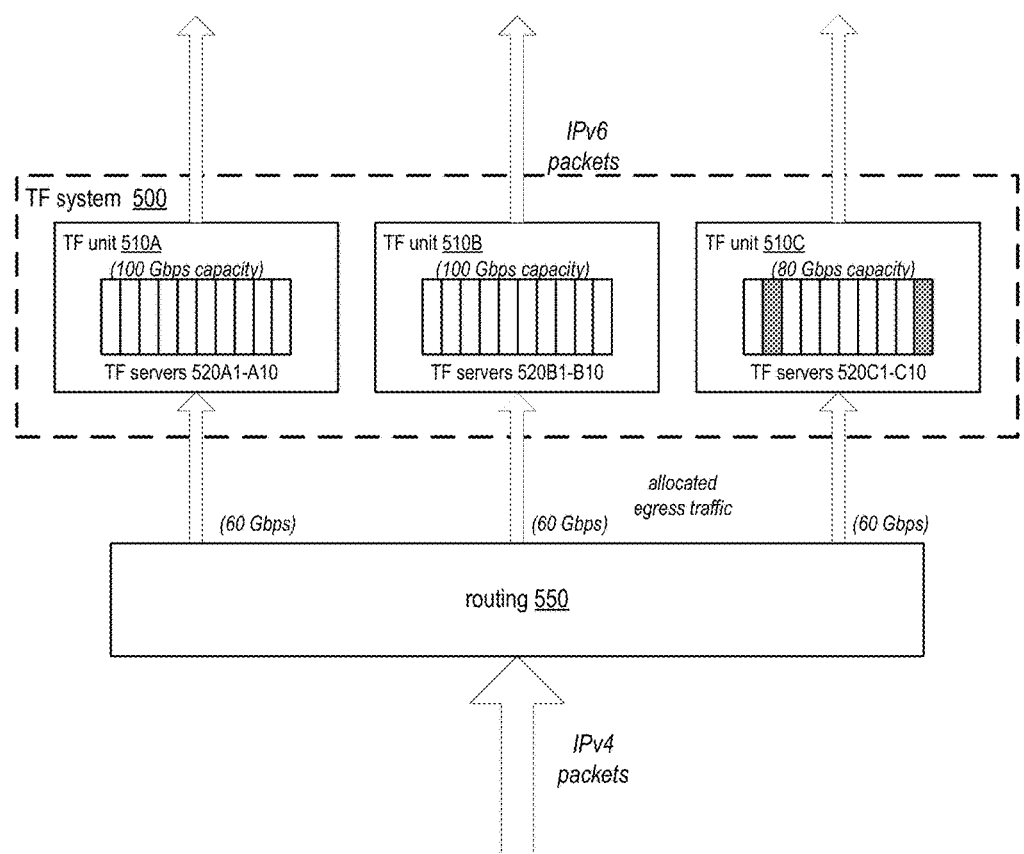
FIGS. 6A and 6B graphically illustrate failure of TF servers in a TF unit of a TF system, according to at least some embodiments.
Figure 6B:
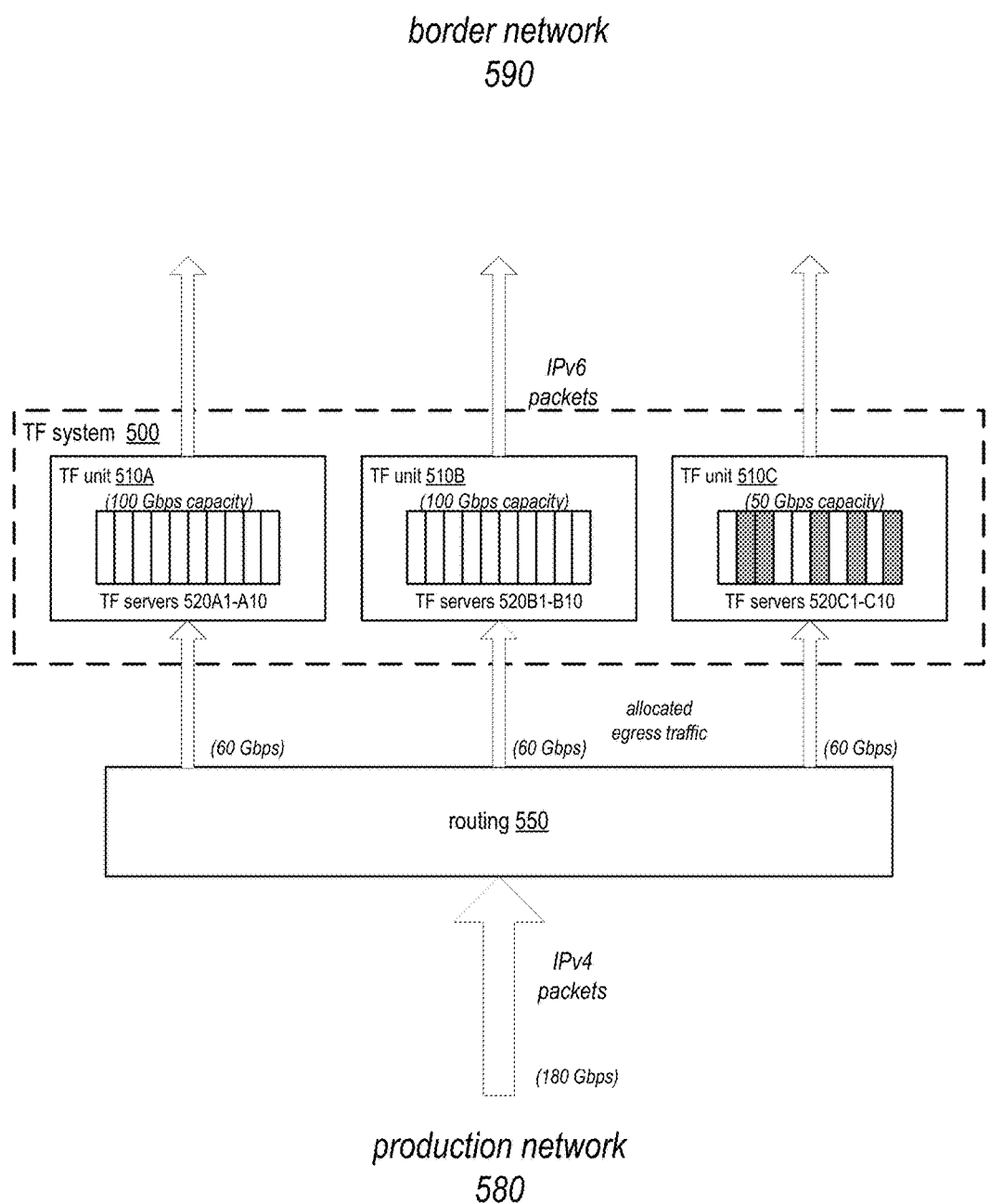

FIGS. 6A and 6B graphically illustrate failure of TF servers in a TF unit of a TF system 500 as illustrated in FIGS. 5A through 5D, according to at least some embodiments. In this example, TF system 500 includes three TF units 510A through 510C, with each TF unit 510 including ten TF servers 520, and with each TF server 520 providing an amount of bi-directional bandwidth capacity. As an example, each TF server 520 may provide 10 Gbps egress bandwidth capacity and 10 Gbps ingress bandwidth capacity. Thus, the total egress or ingress bandwidth capacity for each healthy TF unit 510 in this example would be 100 Gbps, and total egress or ingress bandwidth capacity for TF system 500 in this example, if all of its units 510 are healthy, would be 300 Gbps.

Figure 6C:
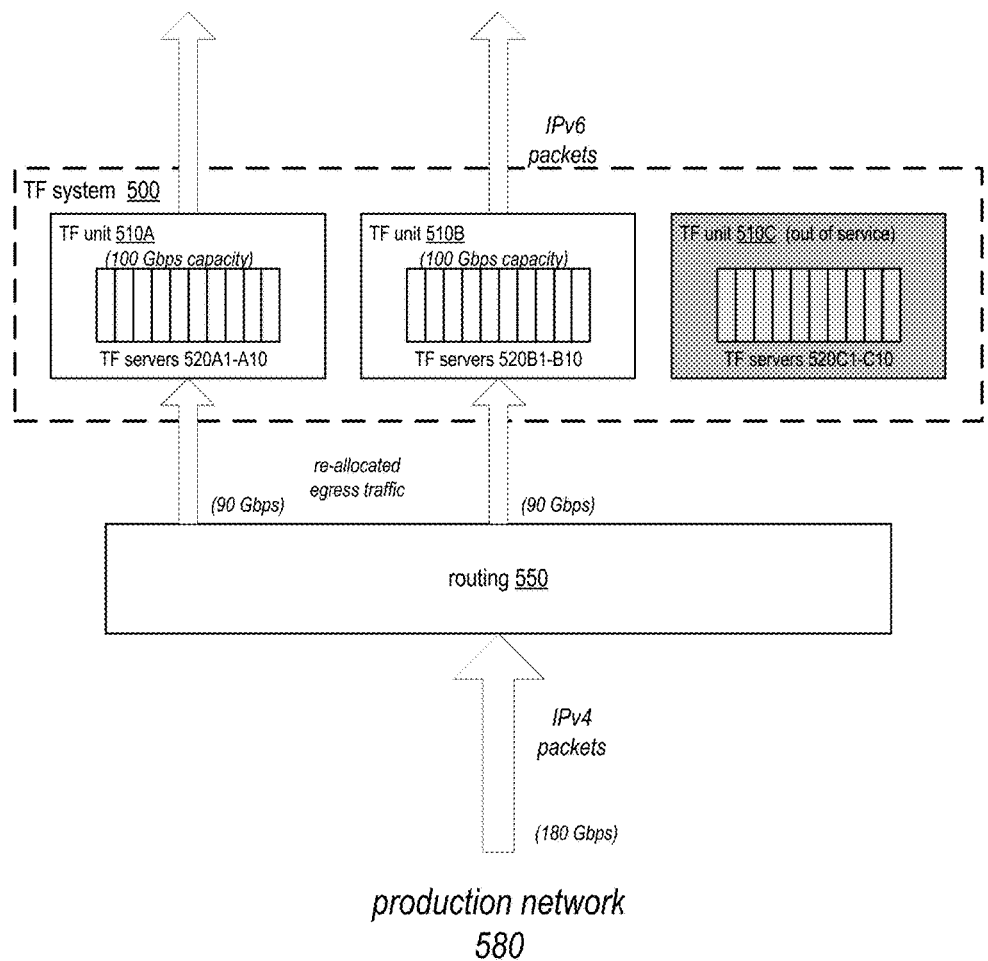
FIG. 6C graphically illustrates a method for handling failure of TF servers in a TF unit of a TF system, according to at least some embodiments.

For simplicity, FIGS. 6A through 6C and the following discussion generally use routing of egress traffic from a production network through a TF system onto a border network as an example. However, the Figures and discussion would also apply to routing ingress traffic from a border network through a TF system onto a production network. Moreover, the methods for handling failure of TF servers in a TF system as described in reference to FIGS. 6A through 6C and FIG. 7 may be generally applied in any system that handles traffic forwarding between two networks and that includes multiple units or clusters of traffic forwarding servers or hosts.

As shown in FIG. 6A, routing technology 550 has allocated the egress traffic from the local production network among TF units 510A through 510C, for example according to an ECMP routing technique. For example, if peak egress traffic is determined to be 180 Gbps, then 60 Gbps of egress traffic may be allocated to each TF unit 510 in TF system 500. Since total egress bandwidth capacity for each TF unit 510 in this example is 100 Gbps, each TF unit 510 has 40 Gbps spare capacity.

In at least some embodiments, the TF servers 520 in one or more of the TF units 510 in the TF system 500 may implement a health check protocol to monitor health of the TF servers 520 in the unit 510 and to detect healthy and unhealthy or unavailable TF servers 520 in the unit 510. In some embodiments, each TF server 520 in a TF unit 510 may monitor its own health, and may also monitor the health of one or more other TF servers 520 in its unit 510. In some embodiments, health checking a TF server 520 may include using health check pings sent to the NICs 522 of a TF server 520 from the NICs 522 of at least one other TF server 520 in the TF unit 510. The pings may be used to verify that network paths to and from the NICs 522 of a given server 520 are operational, and to verify that the NICs 522 themselves are operational. If one or more of the NICs 522 in a TF server 520 do not respond to the pings for a specified period, the other server(s) 520 may record in their local health information that the TF server 520 is unhealthy or out of service. In some embodiments, the health check protocol may involve each TF server 520 monitoring its own health; if a TF server 520 detects that it is unhealthy (e.g., that the TF server 520 can no longer reliably handle its portion of the egress and/or ingress traffic bandwidth, or that one or more monitored components of the server 520 are experiencing problems or generating errors), the TF server 520 may inform one or more others of the TF servers 520 in the TF unit 510 that it is unhealthy. In some embodiments, an unhealthy TF server 520 may take itself out of service. However, an unhealthy TF server 520 may simply fail, or a TF server 520 (whether healthy or unhealthy) may be taken out of service by some other entity. In some embodiments, the TF servers 520 in a TF unit 510 may locally store health information, and may propagate the health information to other TF servers 520 in the respective TF unit 510, for example using a gossip protocol. This health information may include information about their own health and information about the health of one or more other TF servers 520. In some embodiments, TF server 520's health information may also be shared with routers 530 and 532 in the respective TF unit 510.

As shown in FIG. 6A, two TF servers 520 in TF unit 510C, indicated by the shaded rectangles, are unhealthy or out of service for some reason. In at least some embodiments, the TF servers 520 in the TF unit 510C may detect the servers 520 are down or unreachable via a health check protocol. For example, one or more other TF servers 520 in the TF unit 510C may determine that the TF servers 520 are currently out of service or unreachable when the TF servers 520 do not respond to pings for a specified period; this health information may be propagated to or shared with other servers 520 in the TF unit 510C, for example using a gossip protocol. Since two servers 520 are down in TF unit 510C, the egress traffic bandwidth capacity for TF unit 510C has dropped to 80 Gbps, still above TF unit 510C's allocated portion of the egress traffic (60 Gbps).

As shown in FIG. 6B, three additional TF servers 520 in TF unit 510C have gone out of service for some reason. The TF servers 520 in the TF unit 510C may detect the down servers 520 using the health check protocol. Since five servers 520 are now down in TF unit 510C, the egress traffic bandwidth capacity for TF unit 510C has dropped to 50 Gbps, below TF unit 510C's allocated portion of the egress traffic (60 Gbps). Thus, TF unit 510C may not be able to reliably handle its allocated portion of the egress traffic, which may result in congestion-related delays, high latency, packet losses, and other problems on connections through the TF unit 510C.

FIG. 6C graphically illustrates a method for handling failure of a threshold number of TF servers 520 in a TF unit 510 of a TF system 500, according to at least some embodiments. In some embodiments, the TF units 510 in a TF system 500 may have a threshold number of TF servers 520, and/or a threshold amount of total egress and/or ingress bandwidth capacity, below which the units 510 may not be able to reliably handle their allocated portion of the egress and/or ingress traffic. For example, in the example TF system 500 of FIGS. 6A through 6C, the TF units 510 may have six as a threshold number of TF servers, and/or 60 Gbps as a threshold amount of total available egress bandwidth. A TF unit 510 that drops below the threshold may be considered unhealthy. In some embodiments, the threshold may be determined from the amount of traffic that is allocated to the TF unit 510, so the threshold may change if the allocated amount of traffic is changed. In some embodiments, instead of an unhealthy TF unit 510 staying in service and attempting to handle its share of the egress and ingress traffic, the TF unit 510 may automatically stop advertising routes or otherwise take itself out of service in the TF system 500, informing TF system 500 and/or routing technology 550 and possibly other TF units 510 in the TF system 500 that it is not currently available, and is not currently advertising routes on the production network 580 or border network 590. In at least some embodiments, the remaining TF units 510 may include healthy units with enough healthy servers 520 and spare capacity to handle the additional traffic.

For example, the TF unit 510C may determine that five of its TF servers 520 are currently unhealthy or out of service as indicated in FIG. 6B. Since six is TF unit 510C's threshold number of healthy servers 520, and there are only five healthy servers 520 remaining in TF unit 510C, the TF unit 510C determines that it is not healthy, and may automatically stop advertising routes or otherwise take itself out of service in the TF system 500 as indicated in FIG. 6C. The TF unit 510C may stop advertising routes, and may inform routing technology 550 that it is not currently available, or routing technology 550 may discover that TF unit 510 is out of service by other means. As shown in FIG. 6C, routing technology 550 may re-allocate the total egress traffic from the local production network among TF units 510A and 510B, for example according to an ECMP routing technique. For example, if peak egress traffic from the local production network is 180 Gbps, then 90 Gbps of egress traffic may be allocated to the remaining two TF units 510 in TF system 500. Since total egress bandwidth capacity for each TF unit 510 in this example is 100 Gbps, each TF unit 510 is allocated less than its capacity for egress traffic. Similarly, ingress traffic may be re-allocated among the remaining healthy TF units 510 by routing technology on the border network 590 side.

Having an unhealthy TF unit 510 take itself out of service rather than allowing the TF unit 510 to continue attempting to process and forward its allocated portion of the traffic may, for example, help prevent congestion-related delays, high latency, packet losses, and other problems on connections through the unhealthy TF unit 510 that may result from allowing an unhealthy TF unit 510 with reduced total bandwidth capacity to stay online.

Referring to FIG. 6C, it is possible that one of the remaining TF units 510A or 510B may experience server 520 failures as illustrated in FIGS. 6A-6B. One of the remaining TF unit 510 (e.g., TF unit 510B) may drop below the threshold at which it can no longer reliably handle its allocated portion of the traffic (90 Gbps in FIG. 6C). However, in this example, removing TF unit 510B would result in the remaining unit (TF unit 510A) being allocated all 180 Gbps of the traffic. If this scenario happens, in some embodiments, the TF system 500 in the zone may go out of service, and a method for handling a TF system failure in a zone as illustrated in FIGS. 3A-3D and FIG. 4 may be performed. However, in some cases, instead of taking the TF system 500 out of service, the TF system 500 may be kept in service, and an unhealthy TF unit 510 (e.g., TF unit 510B) may be kept in service even if the unit 510 can no longer reliably handle its allocated portion of the traffic. For example, if another TF system in another zone of a network as illustrated in FIG. 1A is already out of service, taking a second TF system out of service may overwhelm the TF system(s) in remaining zones. Thus, in some embodiments, an unhealthy TF system 500 may be kept in service, and an unhealthy TF unit 510B in the TF system may be kept in service, to handle as much traffic as possible, rather than shutting down the TF unit 510B and TF system 500.

While not shown in FIGS. 6A through 6C, in some embodiments, when a TF unit 510C is out of service as indicated in FIG. 6C, the TF servers 520 in the unit 510C may continue to participate in a health check protocol to monitor health of the servers 520 in the unit 510C, and may discover that one or more of its unhealthy or out-of-service TF servers 520 have become healthy and available. In some embodiments, the TF servers in an unhealthy TF unit 510C may thus determine that the unit 510C has recovered enough servers 520 to be at or over the unit 510's health threshold (e.g., six servers 520 in the example system 500 of FIGS. 6A through 6C). In some embodiments, the TF servers 520 in the TF unit 510C may bring the unit 510C back into service in the TF system 500, informing routing technology 550 and TF system 500, and again advertising routes on the local production and/or border networks. Routing technology 550 may then re-allocate the total egress traffic from the local production network among the healthy TF units 510 in the TF system 500. Similarly, total ingress traffic may be re-allocated to the healthy TF units 510.

While not shown in FIGS. 6A through 6C, in some embodiments, a new TF unit 510 may be added to a TF system 500, and may begin advertising routes on the local production and border networks. In some embodiments, in response to detecting a new TF unit 510 coming online in the TF system, the egress and ingress traffic may be re-allocated among the healthy TF units 510 in the TF system 500.

FIGS. 6A through 6C show an example TF system 500 that includes three TF units 510, each unit 510 including ten TF servers 520. However, this example configuration is not intended to be limiting. TF systems 500 may include more or fewer TF units 510, and TF units 510 may include more or fewer TF servers 520. Further, FIGS. 6A through 6C use example values for the peak egress traffic from the local production network, egress bandwidth capacity for the TF servers 520, and total egress bandwidth capacity for each TF unit 510; these examples are not intended to be limiting.

Figure 7:
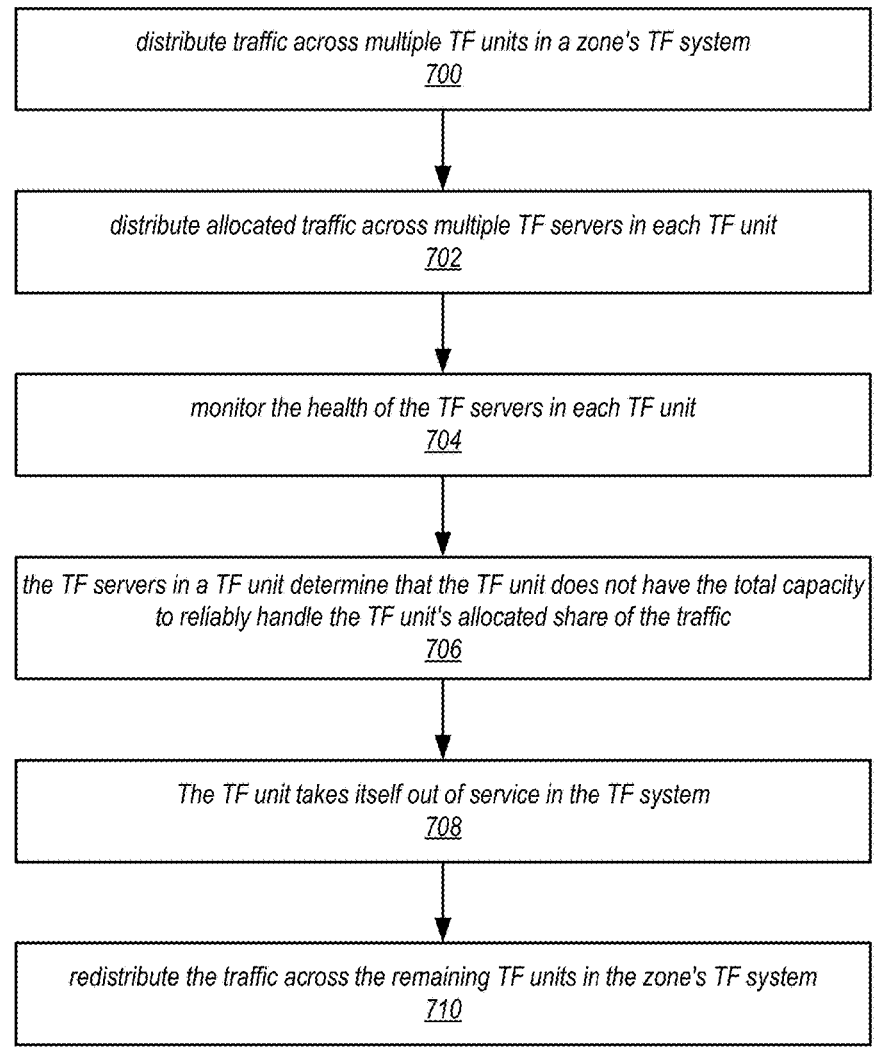
FIG. 7 is a flowchart of a method for handling failure of a threshold number of TF servers in a TF unit of a TF system, according to at least some embodiments.

FIG. 7 is a flowchart of a method for handling failure of a threshold number of TF servers in a TF unit of a TF system, according to at least some embodiments. The method of FIG. 7 may, for example, be implemented in TF servers 500 as illustrated in FIGS. 5A through 5D and FIGS. 6A through 6C.

As indicated at 700 of FIG. 7, total traffic bandwidth may be allocated across two or more TF units 510 in a zone's TF system 500. For example, in some embodiments, routing technology 550 of the local production network may distribute the outbound (egress) traffic among the TF units 510 in the TF system 500, for example according to an ECMP routing technique that spreads egress traffic across the TF units 510 in the TF system 500, with each TF unit 510 responsible for processing and forwarding its allocated portion of the egress traffic. Similarly, ingress traffic from the border network may be distributed among the TF units 510 by routing technology on the border network side.

As indicated at 702 of FIG. 7, traffic may be distributed across the TF servers 520 in each TF unit 510 of the zone's TF system 500. For example, in some embodiments, each TF unit 510 includes routing technology that distributes its portion of the egress traffic among the TF servers 520 in the respective unit 510, for example according to an ECMP routing technique, with each TF server 520 responsible for processing and forwarding its allocated portion of the egress traffic. Each TF unit 510 may also include routing technology that distributes its portion of the ingress traffic among the TF servers 520 in the respective unit 510, for example according to an ECMP routing technique, with each TF server 520 responsible for processing and forwarding its allocated portion of the ingress traffic As indicated at 704 of FIG. 7, the health of the TF servers 520 in the TF units may be monitored. In some embodiments, the TF servers 520 in each TF unit 510 may implement a health check protocol to monitor health of the TF servers 520 in the respective TF unit 510 and to detect unhealthy or unavailable TF servers 520 in the respective TF unit 510. In some embodiments, each TF server 520 in a TF unit 510 may monitor its own health, and may also monitor the health of one or more other TF servers 520 in the unit 510. In some embodiments, health checking a TF server 520 may include using health check pings sent to the NICs 522 of a TF server 520 from the NICs 522 of at least one other TF server 520 in the TF unit 510. The pings may be used to verify that network paths to and from the NICs 522 of a given server 520 are operational, and to verify that the NICs 522 themselves are operational. If one or more of the NICs in a TF server 520 do not respond to the pings for a specified period, the other server(s) 520 may record in their local health information that the TF server 520 is unhealthy or out of service. In some embodiments, the health check protocol may involve each TF server 520 monitoring its own health; if a TF server 520 detects that it is unhealthy (e.g., that the TF server 520 can no longer handle its portion of the egress and/or ingress traffic bandwidth, or that one or more monitored components of the server 520 are experiencing problems or generating errors), the TF server 520 may inform one or more others of the TF servers 520 in the TF unit 510 that it is unhealthy. In some embodiments, an unhealthy TF server 520 may take itself out of service. However, an unhealthy TF server 520 may simply fail, or a TF server 520 (whether healthy or unhealthy) may be taken out of service by some other entity. In some embodiments, the TF servers 520 in a TF unit 510 may locally store health information, and may propagate health information to other TF servers 520 in the respective TF unit 510, for example using a gossip protocol. This health information may include information about their own health and information about the health of one or more other TF servers 520. In some embodiments, TF server 520's health information may also be shared with routers 530 and 532 in the respective TF unit 510.

As indicated at 706 of FIG. 7, the TF servers in a TF unit in the zone may determine that the TF unit does not have the total capacity to reliably handle the TF unit's share of the egress and/or egress traffic. In some embodiments, the TF units 510 in a TF system 500 may have a threshold number of TF servers 520, and/or a threshold amount of total egress bandwidth capacity, below which a TF unit 510 may not be able to reliably handle its allocated portion of the traffic. A TF unit 510 that drops below the threshold may be considered unhealthy. For example, the TF servers 520 in a TF unit 510 may collectively determine, using the health check protocol, that fewer than the threshold number of TF servers 520 in the TF unit 510 are currently healthy. Since there are fewer healthy TF serves 520 in the unit 510 than the threshold number of TF servers 520, the TF servers 520 in the TF unit 510 determine that the TF unit 510 is not healthy.

As indicated at 708 of FIG. 7, in response to determining that is the TF unit 510 not healthy, the TF unit 510 may take itself out of service in the TF system 500. For example, the TF unit 510 may stop advertising routes, and may inform routing technology 550 that it is not currently available, or routing technology 550 may otherwise discover that TF unit 510 is taking itself out of service in the TF system 500.

As indicated at 710 of FIG. 7, in response to detecting that the TF unit 510 is out of service in the TF system 500, the total traffic bandwidth may be redistributed across the remaining healthy TF units 510 in the zone's TF system 500. For example, routing technology 550 may re-allocate the total egress traffic from the local production network among one, two, or more healthy TF units 510 remaining in the TF system 500, for example according to an ECMP routing technique. Similarly, ingress traffic from the border network may be redistributed among the remaining healthy TF units 510 by routing technology on the border network side.

Example Provider Network Environments

FIGS. 1 through 11 and this section describe example provider network environments in which embodiments of the methods and apparatus as described in reference to FIGS. 1 through 7 may be implemented. However, these example provider network environments are not intended to be limiting.

Figure 8:
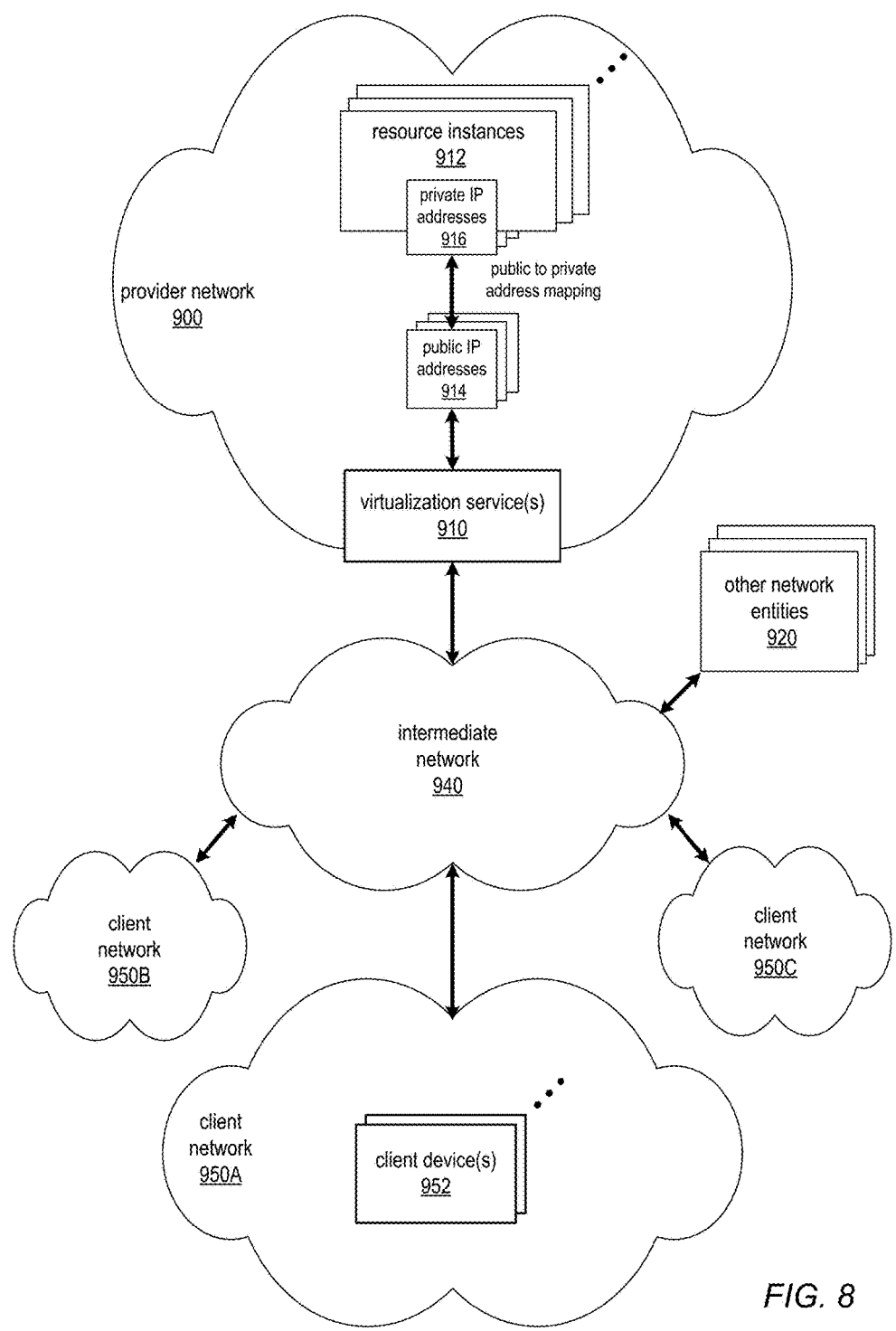
FIG. 8 illustrates an example provider network environment, according to at least some embodiments.

FIG. 8 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., IPv4 or IPv6 addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 9:
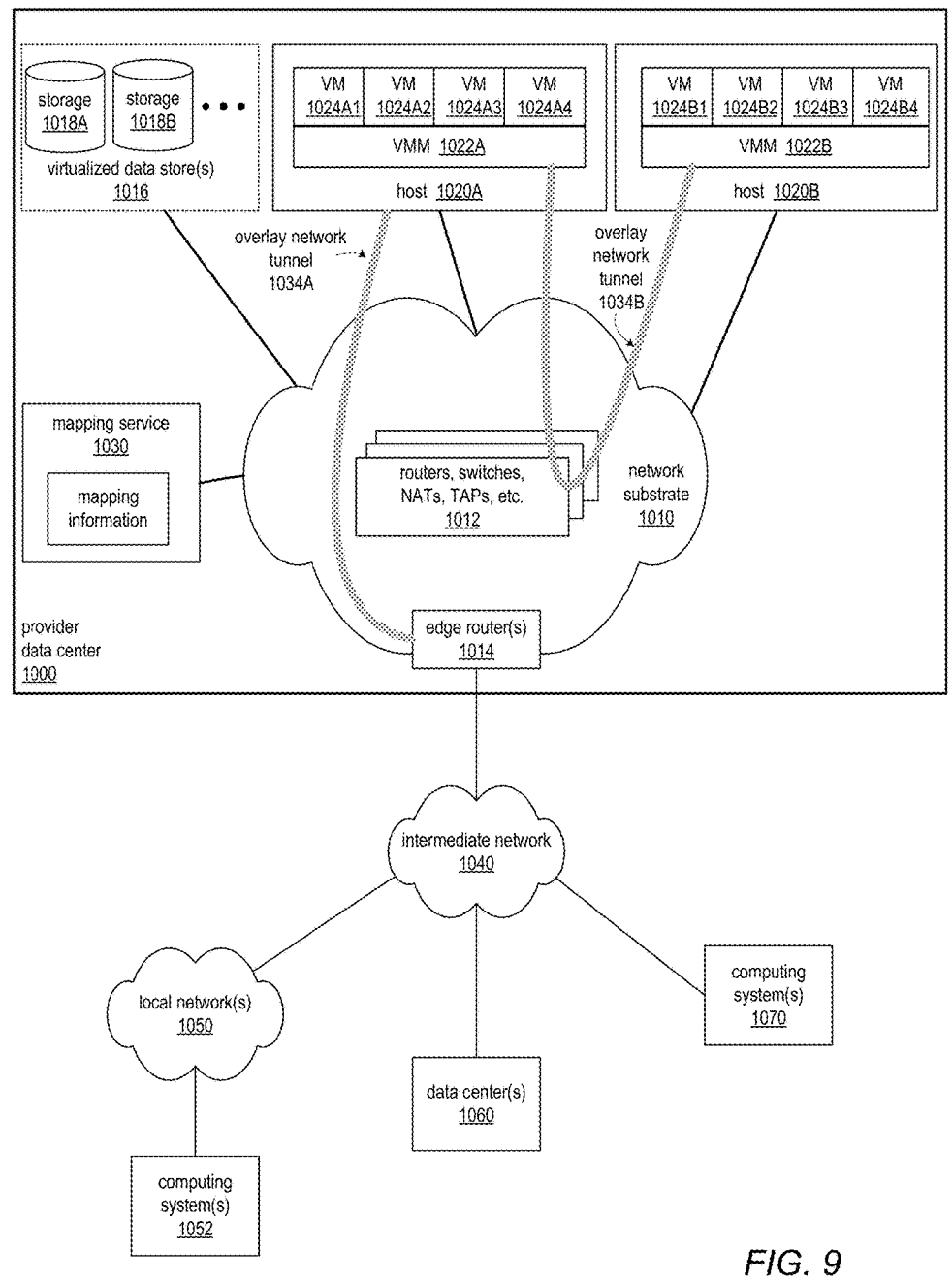
FIG. 9 illustrates an example data center that implements an overlay network on a network substrate using IP tunneling technology, according to some embodiments.

FIG. 9 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 9) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 9, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 addresses as the public IP addresses, and the IPv4 addresses may be embedded as part of 128-bit IPv6 addresses used on the substrate network as the private IP addresses.

Referring to FIG. 9, at least some networks in which embodiments may be implemented may include hardware virtualization technology that enables multiple operating systems to run concurrently on a host computer (e.g., hosts 1020A and 1020B of FIG. 9), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 9 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 10:
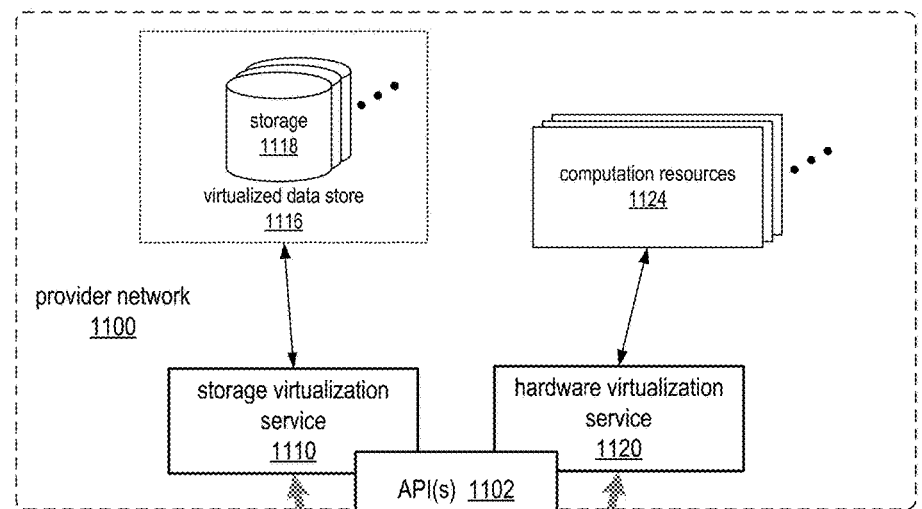
FIG. 10 is a block diagram of an example provider network that provides a storage virtualization service and a hardware virtualization service to clients, according to at least some embodiments.
Figure 10:
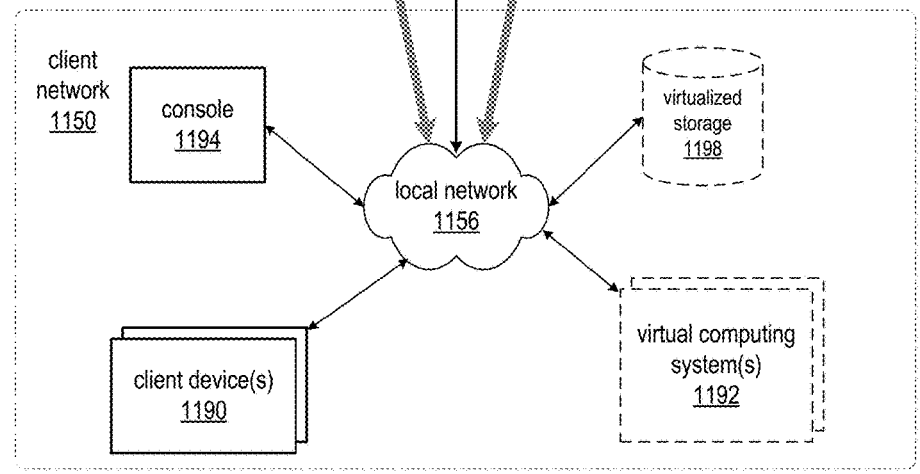

FIG. 10 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 10, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

Figure 11:
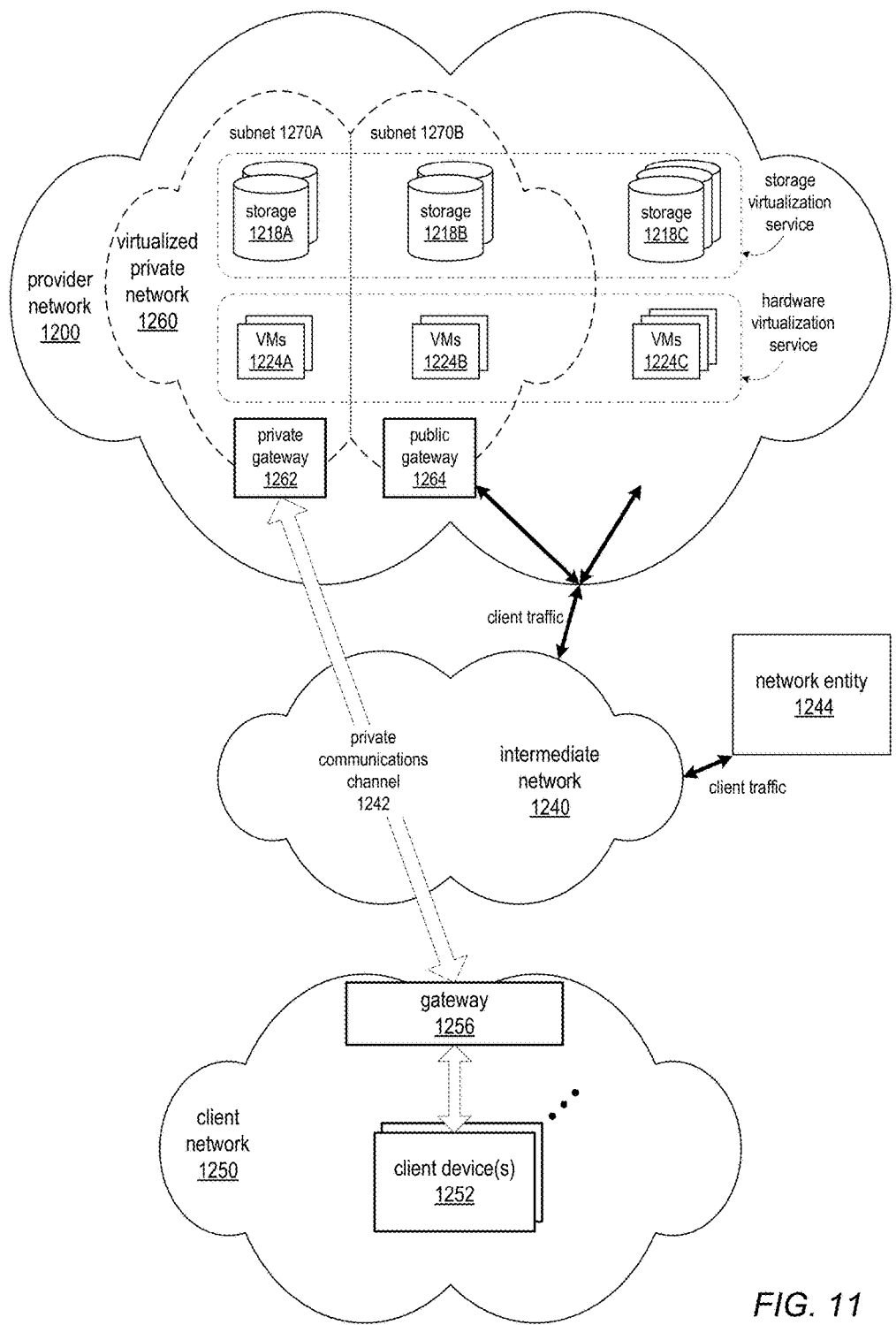
FIG. 11 illustrates an example provider network that provides virtualized private networks to at least some clients, according to at least some embodiments.

FIG. 11 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more address spaces, subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 11 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 11 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

Illustrative System

Figure 12:
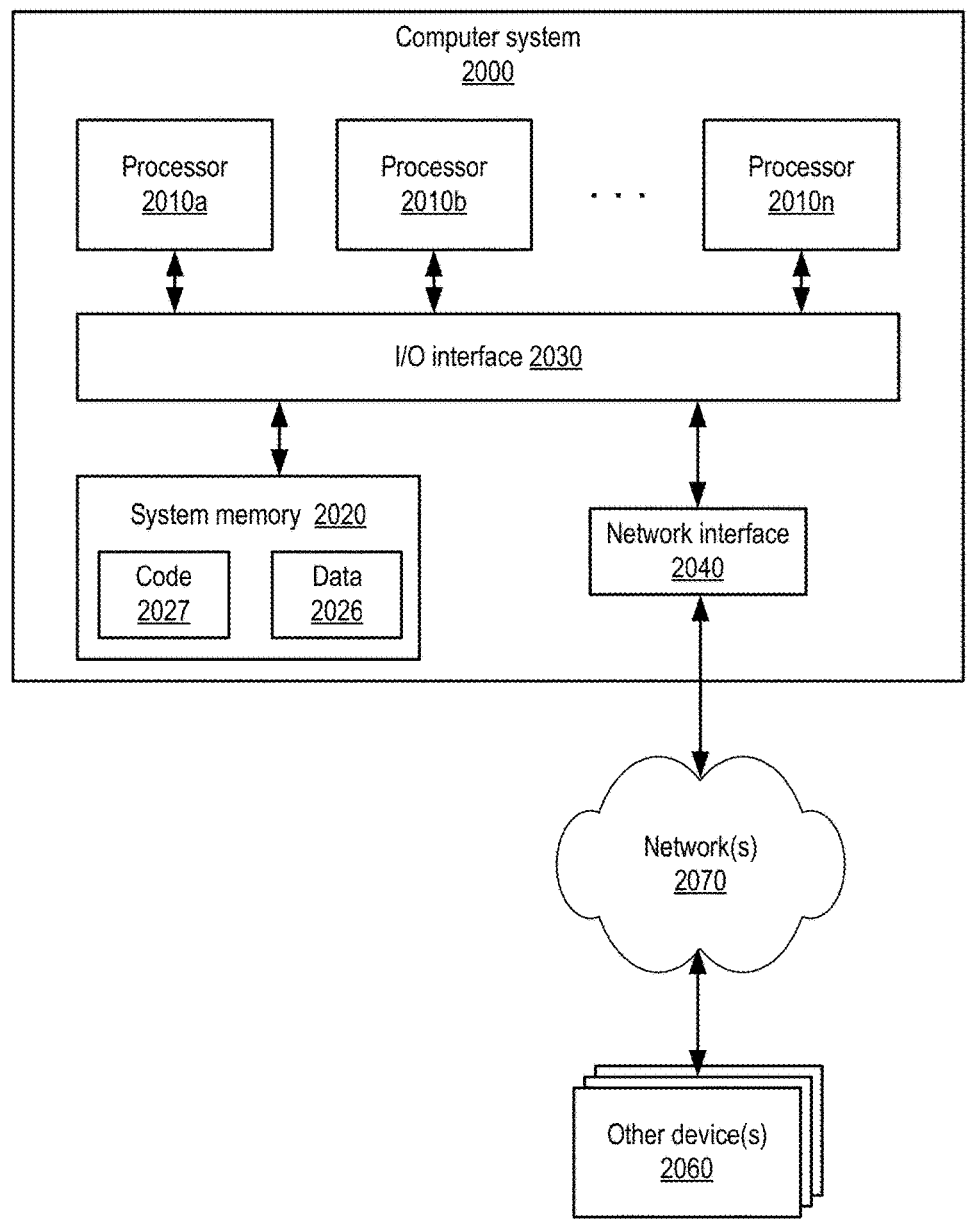
FIG. 12 is a block diagram illustrating an example computer system that may be used in some embodiments.

In at least some embodiments, a server that implements a portion or all of the methods and apparatus as described herein may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above in reference to FIGS. 1 through 7, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 11, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for implementing embodiments of methods and apparatus as described in reference to FIGS. 1 through 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a network that implements an address space according to a first network protocol;
 a traffic forwarding (TF) system configured to handle forwarding of traffic between the network and an external network that implements an address space according to a second network protocol, wherein the TF system comprises a plurality of TF units, each TF unit comprising a plurality of TF servers;
 wherein the network is configured to distribute the traffic among active TF units in the TF system, and wherein each active TF unit is configured to distribute its portion of the traffic among active TF servers in the TF unit, wherein the TF servers in each active TF unit advertise routes for outbound traffic on the network;
 wherein the TF servers in at least one TF unit are configured to:
  monitor the TF servers in the TF unit to detect TF servers that are currently active; and
  stop advertising routes for traffic on the network in response to determining that the active TF servers in the TF unit have dropped below a threshold number of active TF servers;
 wherein the network is configured to redistribute the traffic among the remaining active TF units in the TF system in response to the TF servers stopping advertising routes for traffic on the network.

2. The system as recited in claim 1, wherein the threshold number of active TF servers is a number of active TF servers below which the TF unit cannot reliably handle its portion of the traffic.

3. The system as recited in claim 1, wherein the remaining active TF units in the TF system have enough spare capacity to handle the redistributed traffic.

4. The system as recited in claim 1, wherein, to monitor the TF servers in the TF unit to detect TF servers that are currently active, the TF servers in the TF unit implement a health check protocol in which each TF server in the TF unit checks the health of at least one other TF server in the TF unit and in which health information is propagated among the TF servers in the TF unit.

5. The system as recited in claim 1, wherein the network is configured to distribute the traffic among the active TF units in the TF system according to an equal-cost multi-path (ECMP) routing technique.

6. The system as recited in claim 1, wherein each TF unit is configured to distribute its portion of the traffic among the active TF servers in the TF unit according to an equal-cost multi-path (ECMP) routing technique.

7. A method, comprising:
distributing traffic among active traffic forwarding (TF) units in a TF system, wherein the TF system handles forwarding of traffic between the network and an external network, and wherein the TF system comprises a plurality of TF units, each TF unit comprising a plurality of TF servers;
monitoring, by at least one TF server in at least one TF unit in the TF system, the TF servers in the TF unit to detect TF servers in the TF unit that are currently active;
the TF servers in one of the active TF unit in the TF system taking the TF unit out of service in the TF system in response to detecting that active TF servers in the TF unit have dropped below a threshold limit for active TF servers; and
redistributing the traffic among the remaining active TF units in the TF system in response to the TF servers in the TF unit taking the TF unit out of service.

8. The method as recited in claim 7, wherein the threshold limit for active TF servers is a number of active TF servers below which the TF unit cannot reliably handle its portion of the outbound traffic.

9. The method as recited in claim 7, wherein the remaining active TF units in the TF system have enough spare capacity to handle the redistributed traffic.

10. The method as recited in claim 7, wherein said monitoring is performed according to a health check protocol in which each TF server in the TF unit checks the health of at least one other TF server in the TF unit and in which health information is propagated among the TF servers in the TF unit.

11. The method as recited in claim 7, further comprising the TF servers in the TF unit bringing the TF unit back into service in the TF system in response to detecting that active TF servers in the TF unit have risen above the threshold limit for active TF servers.

12. The method as recited in claim 7, wherein the network implements an address space according to a first network protocol, wherein the external network implements an address space according to a second network protocol, and wherein the TF system converts outbound packets from the first network protocol to the second network protocol and converts inbound packets from the second network protocol to the first network protocol.

13. The method as recited in claim 12, wherein the first network protocol is Internet Protocol version 4 (IPv4), and wherein the second network protocol is Internet Protocol version 6 (IPv6).

14. The method as recited in claim 12, wherein the network is a local production network in one of a plurality of zones of a provider network, wherein each zone of the provider network comprises a local production network that implements private address spaces according to the first network protocol, a local border network that implements a public address space according to the second network protocol, and a TF system configured to handle egress of packets from the local production network onto the local border network.

15. The method as recited in claim 7, wherein said distributing traffic from the network among the active TF units is performed according to an equal-cost multi-path (ECMP) routing technique.

16. The method as recited in claim 7, further comprising each TF unit distributing its portion of the traffic among the active TF servers in the TF unit according to an equal-cost multi-path (ECMP) routing technique.

17. The method as recited in claim 7, wherein the TF servers in each active TF unit advertise routes for traffic on the network, and wherein the TF servers in the TF unit taking the TF unit offline in the TF system comprises the TF servers in the TF unit stopping advertising routes on the network.

18. A non-transitory computer-readable storage medium storing program instructions that when executed on one or more computers cause the one or more computers to implement a distributed traffic forwarding (TF) system configured to:
handle egress of outbound traffic from a local network onto an external network and ingress of inbound traffic from the external network onto the local network;
distribute the traffic among two or more active TF units of the TF system, each TF unit comprising a plurality of TF servers;
monitor the TF servers in each TF unit to detect TF servers that are currently active;
deactivate a TF unit in response to determining that the active TF servers in the TF unit have dropped below a threshold limit for active TF servers; and
redistribute the traffic among the remaining active TF units in the TF system in response to deactivating the TF unit.

19. The non-transitory computer-readable storage medium as recited in claim 18, wherein the threshold limit for active TF servers is a number of active TF servers below which the TF unit cannot reliably handle its portion of the traffic.

20. The non-transitory computer-readable storage medium as recited in claim 18, wherein the TF system is further configured to reactivate the TF unit in response to determining that the active TF servers in the TF unit have risen above the threshold limit for active TF servers.

21. The non-transitory computer-readable storage medium as recited in claim 18, wherein, to monitor the TF servers in each TF unit to detect TF servers that are currently active, the TF servers in each TF unit implement a health check protocol in which each TF server in the TF unit checks the health of at least one other TF server in the TF unit and in which health information is propagated among the TF servers in the TF unit.

22. The non-transitory computer-readable storage medium as recited in claim 18, wherein the TF servers in each active TF unit advertise routes for traffic on the local network, and wherein deactivating a TF unit comprises the TF servers in the TF unit stopping advertising routes on the local network.

23. The non-transitory computer-readable storage medium as recited in claim 18, wherein the local network implements one or more private address spaces according to a first network protocol, wherein the external network implements a public address space according to a second network protocol, and wherein the TF system is further configured to translate outbound packets from the first network protocol to the second network protocol and translate inbound packets from the second network protocol to the first network protocol.

\* \* \* \* \*